US009832343B2

United States Patent
Shimahashi et al.

(10) Patent No.: US 9,832,343 B2
(45) Date of Patent: Nov. 28, 2017

(54) IMAGE PROCESSING APPARATUS GENERATING ARRANGED IMAGE DATA REPRESENTING ARRANGED IMAGE IN WHICH IMAGES ARE ARRANGED BY USING COMPLEMENTED IMAGE DATA

(71) Applicant: BROTHER KOGYO KABUSHIKI KAISHA, Nagoya, Aichi (JP)

(72) Inventors: Takuya Shimahashi, Nagoya (JP); Tomohiko Hasegawa, Okazaki (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/083,485

(22) Filed: Mar. 29, 2016

(65) Prior Publication Data

US 2017/0094111 A1   Mar. 30, 2017

(30) Foreign Application Priority Data

Sep. 30, 2015 (JP) .................................. 2015-192958

(51) Int. Cl.
  *H04N 1/387* (2006.01)
  *H04N 1/60* (2006.01)

(52) U.S. Cl.
  CPC ......... *H04N 1/3878* (2013.01); *H04N 1/3876* (2013.01); *H04N 1/60* (2013.01); *H04N 2201/0082* (2013.01)

(58) Field of Classification Search
  CPC combination set(s) only.
  See application file for complete search history.

(56) References Cited

U.S. PATENT DOCUMENTS

| 5,481,375 A | 1/1996 | Eto et al. |
| 6,466,340 B1 | 10/2002 | Washio |
| 6,591,076 B2 * | 7/2003 | Connors ................ G03G 15/36 358/450 |
| 8,270,044 B2 * | 9/2012 | Seo ...................... G06K 9/3275 356/602 |

(Continued)

FOREIGN PATENT DOCUMENTS

| JP | H06-164893 A | 6/1994 |
| JP | H11-252351 A | 9/1999 |

*Primary Examiner* — Barbara Reinier
(74) *Attorney, Agent, or Firm* — Scully, Scott, Murphy & Presser, PC

(57) ABSTRACT

An image processing apparatus acquires first and second image data respectively representing first and second image. The first and second image respectively includes first and second target image. The apparatus generates, based on the first image data, corrected image data representing a corrected image including a first corrected target image having a slant end. The apparatus identifies a blank region in contact with the slant end from the corrected image and generates complemented image data representing a complement image by performing, on the corrected image data, a complement process in which pixel values of pixels in the blank region are determined. The apparatus generates arranged image data representing an arranged image in which a first arrangement target image and a second arrangement target image are arranged, by using the complemented image data. The first and second arrangement target images concern the first and second target images, respectively.

11 Claims, 23 Drawing Sheets

TILT CORRECTED SCAN IMAGE

BLANK REMOVED SCAN IMAGE

(56) References Cited

U.S. PATENT DOCUMENTS

| | | | |
|---|---|---|---|
| 9,264,577 B2* | 2/2016 | Shimahashi | H04N 1/3876 |
| 9,307,115 B2* | 4/2016 | Hasegawa | H04N 1/3876 |
| 9,392,140 B2* | 7/2016 | Kawano | H04N 1/409 |
| 9,451,126 B2* | 9/2016 | Ozawa | H04N 1/3876 |
| 2003/0160760 A1* | 8/2003 | Takakura | H04N 1/3876 |
| | | | 345/158 |

* cited by examiner

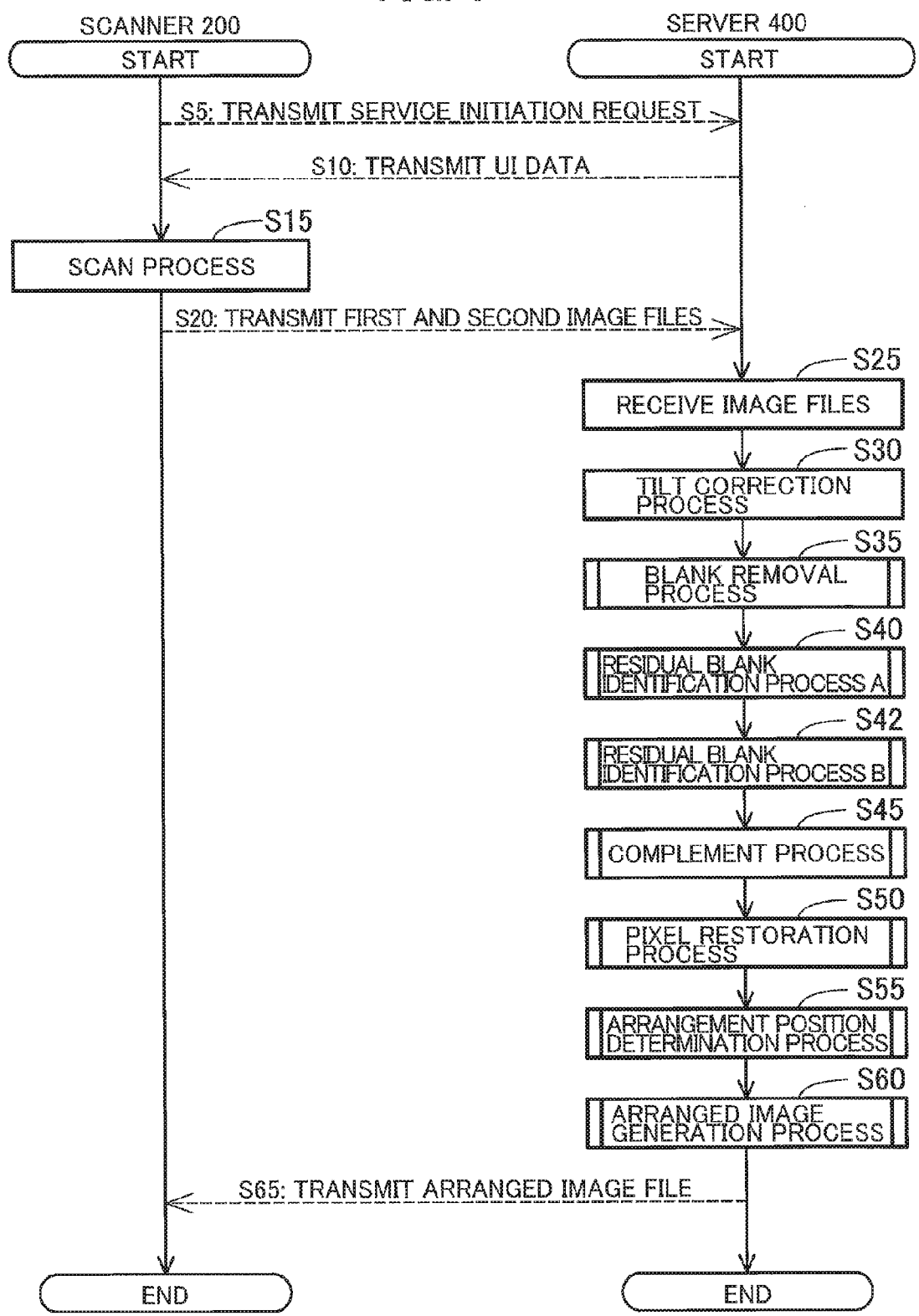

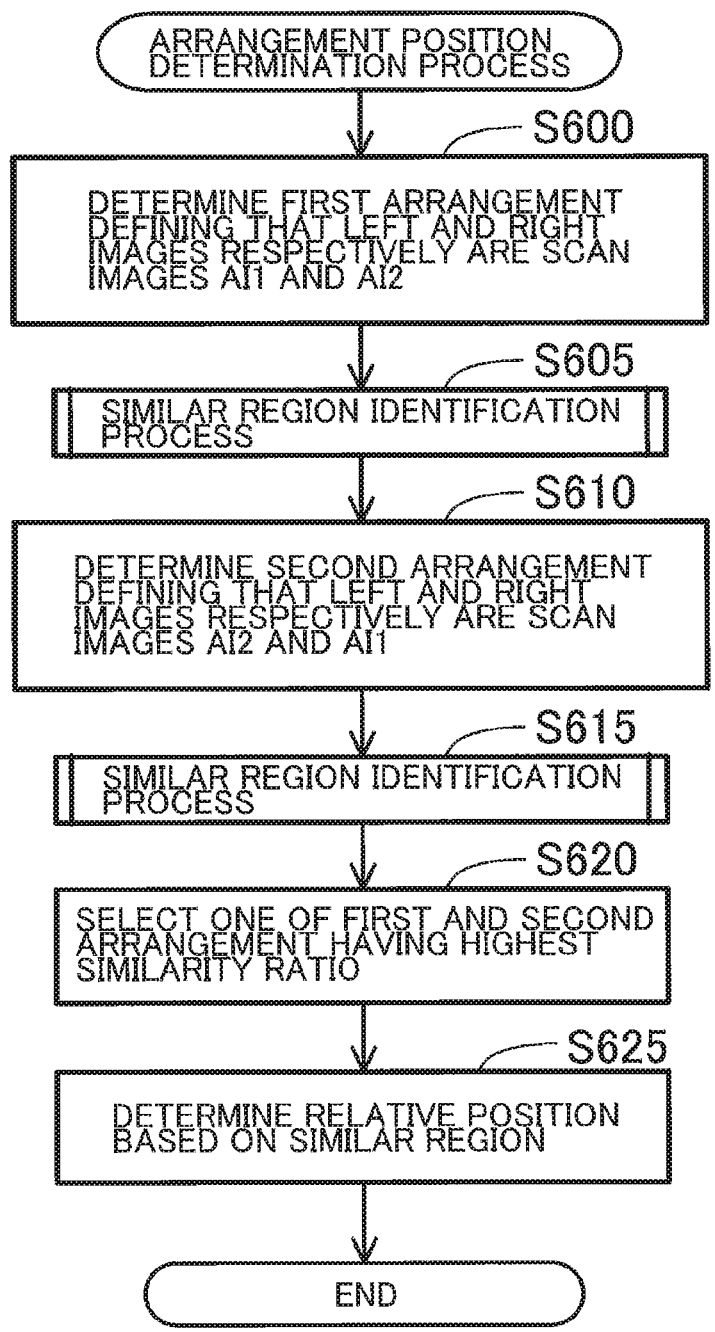

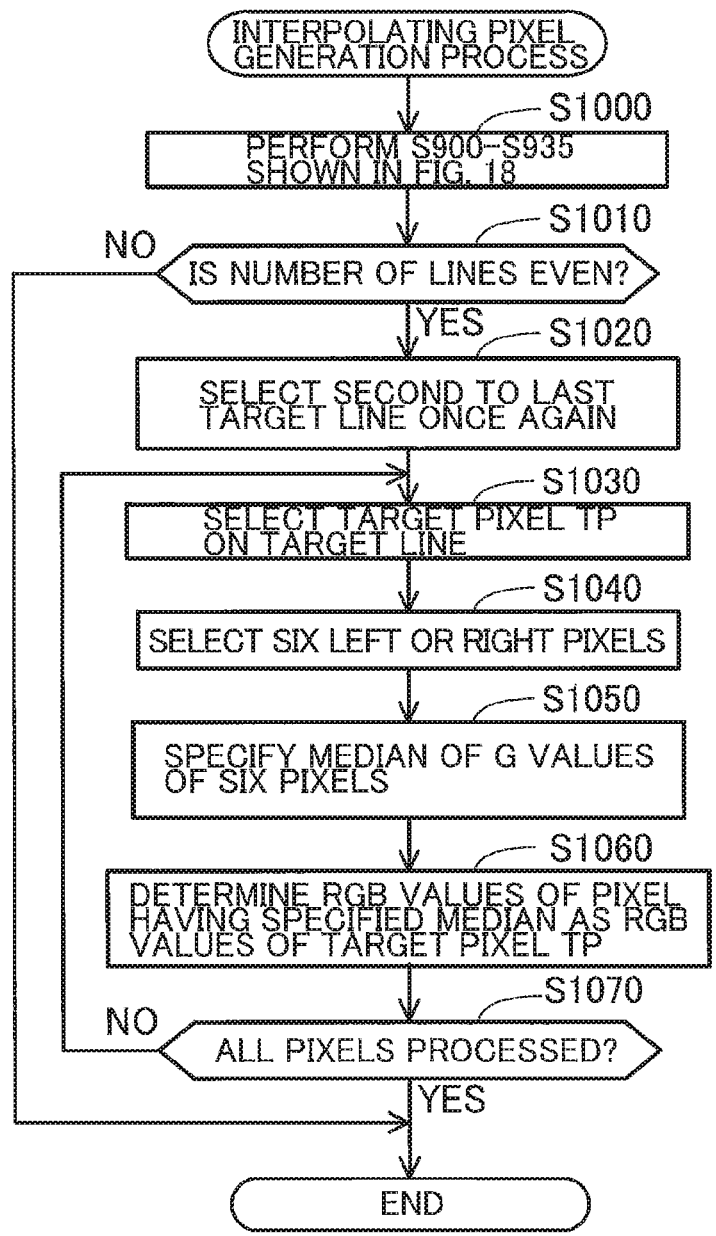

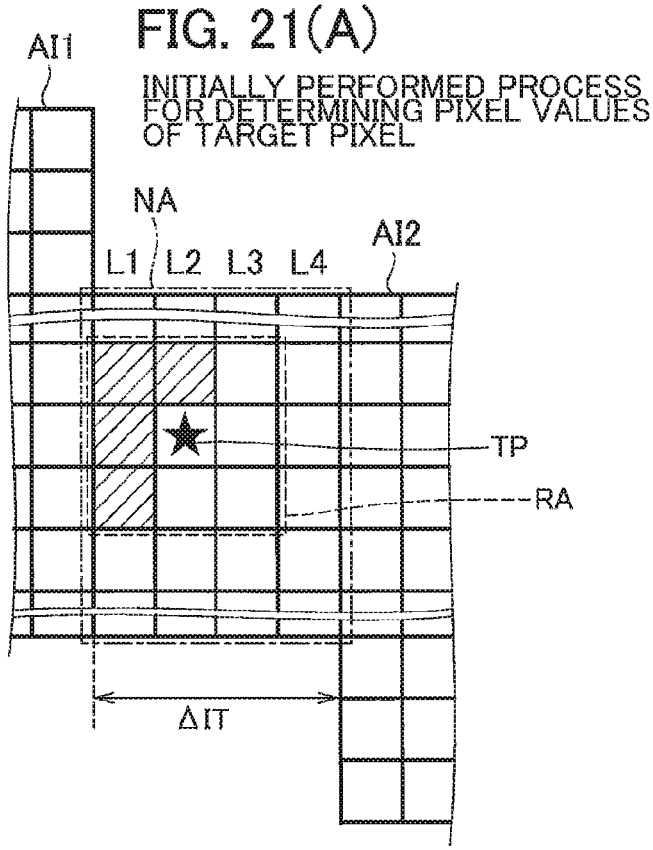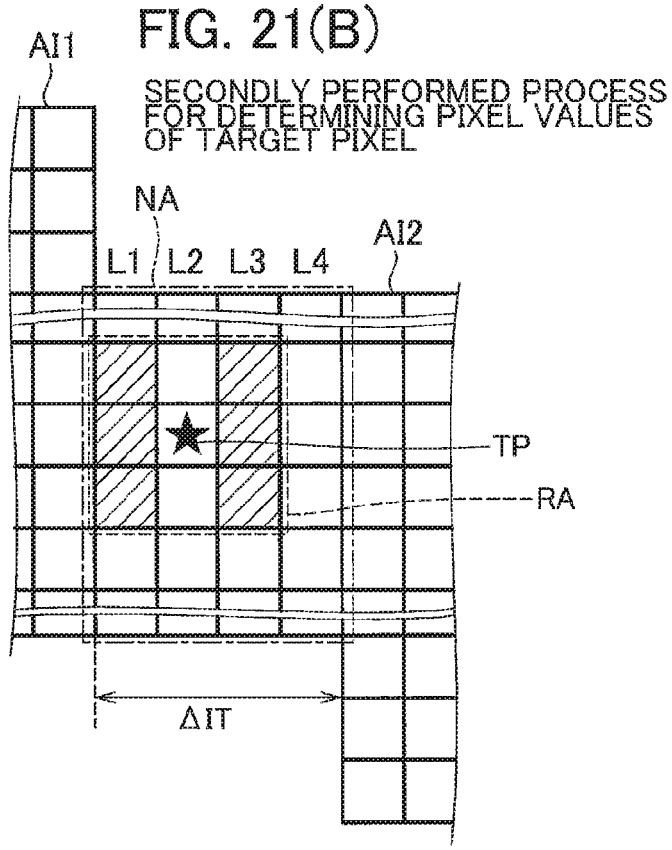

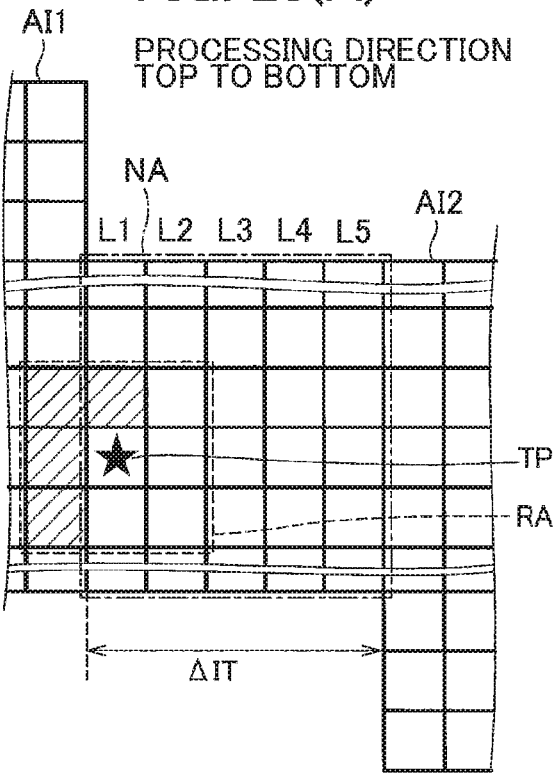
FIG. 23(A) PROCESSING DIRECTION TOP TO BOTTOM
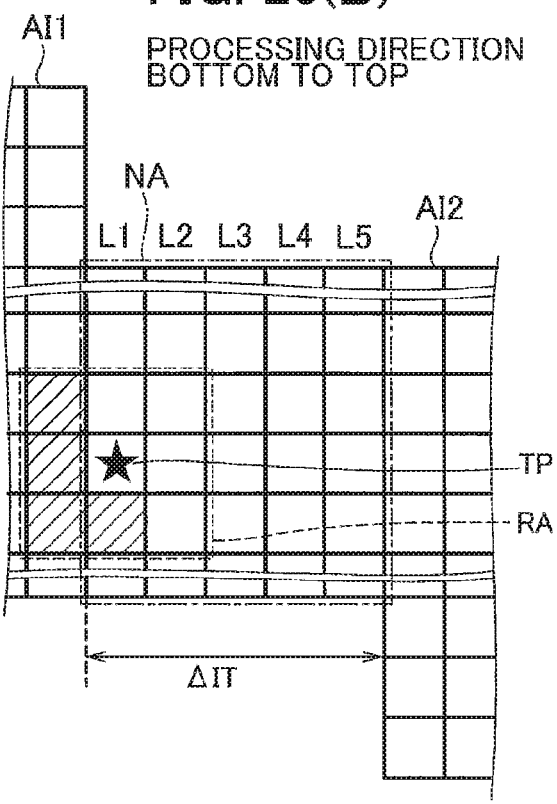
FIG. 23(B) PROCESSING DIRECTION BOTTOM TO TOP under IMAGE PROCESSING APPARATUS GENERATING ARRANGED IMAGE DATA REPRESENTING ARRANGED IMAGE IN WHICH IMAGES ARE ARRANGED BY USING COMPLEMENTED IMAGE DATA

CROSS REFERENCE TO RELATED APPLICATION

This application claims priority from Japanese Patent Application No. 2015-192958 filed Sep. 30, 2015. The entire content of the priority application is incorporated herein by reference.

TECHNICAL FIELD

The present disclosure relates to a technique for generating arranged image data in which a first image and a second image are arranged so as to represent one target object.

BACKGROUND

There is known technique for generating joining two images. When a document has a size that a scanner cannot read by one pass, the scanner reads the document by two passes to obtain the two images. When joining the two images, each image is rotated to correct a tilt that is caused when reading the document.

SUMMARY

However, there is a possibility that the joined image includes an undesired streak. For example, the streak is generated along a region where there is a difference in gradations of pixels. This is because there is a blank region or an region having inappropriate pixel values at a joint region of the two images.

In view of the foregoing, it is an object of the disclosure to provide a technique for reducing generation of steaks when generating arranged image data using first image data and second image data so that an arranged image represents one target object such as an original.

In order to attain the above and other objects, the disclosure provides an image processing apparatus. The image processing apparatus includes a processor and a memory. The memory stores computer-readable instructions therein. The computer-readable instructions, when executed by the processor, causes the image processing apparatus to perform: acquiring first image data representing a first image and second image data representing a second image, the first image including a first target image showing a part of a target object and the second image including a second target image showing another part of the target object; generating first corrected image data representing a first corrected image by performing, on the first image data, a first tilt correction process in which the first image is rotated by a first rotation angle so as to correct a tilt of the first target image, the first corrected image including a first corrected target image based on the first target image, the first corrected target image including a first slant end with respect to a first direction, the first slant end being slanted with respect to a first end of the first corrected image with respect to the first direction by a first slant angle based on the first rotation angle; identifying a first blank region from the first corrected image, the first blank region being a region in contact with the first slant end, the first blank region including a plurality of first blank-region pixels therein; generating first complemented image data representing a first complemented image by performing, on the first corrected image data, a first complement process in which a plurality of pixel values of the plurality of first blank-region pixels is determined using a plurality of pixel values of a plurality of pixels that is located in a first complement target image and along the first slant end, the first complement target image being one of the first corrected target image and an image based on the first corrected target image, the first complemented image including the first complement target image and a first complement image formed by the plurality of first blank-region pixels in the first blank region; and generating arranged image data representing an arranged image by using the first complemented image data, wherein, in the arranged image, an first arrangement target image and a second arrangement target image are arranged to represent the target object, the first arrangement target image being one of the first complement target image and an image based on the first complement target image, the second arrangement target image being one of the second target image and an image based on the second target image, the first arrangement target image including an end corresponding to the first slant end as an end with respect to a direction from the first arrangement target image to the second arrangement target image.

According to another aspects, the disclosure provides an image processing apparatus. The image processing apparatus includes a processor and a memory. The memory stores computer-readable instructions therein. The computer-readable instructions, when executed by the processor, causes the image processing apparatus to perform: acquiring first image data representing a first image and second image data representing a second image, the first image including a first target image showing a part of a target object and the second image including a second target image showing another part of the target object; determining a relative position between a first arrangement target image and a second arrangement target image so that the first arrangement target image and the second arrangement target image are arranged with a gap therebetween, the first arrangement target image being one of the first target image and an image based on the first target image, the second arrangement target image being one of the second target image and an image based on the second target image; and generating arranged image data representing an arranged image in which the first arrangement target image and the second arrangement target image are arranged according to the relative position. The generating includes: selecting a target pixel from among a plurality of interpolating pixels located on the gap; and determining a pixel value of the target pixel by using at least one pixel value of at least one pixel, each of the at least one pixel satisfying a condition that a pixel is a peripheral pixel in a specific region located peripheral the target pixel and a condition that a pixel is one selected from a group consisting of a pixel in the first arrangement target image, a pixel in the second arrangement target image, and an interpolating pixel whose pixel value has already been determined before the current target pixel is selected.

According to still another aspects, the disclosure provides a non-transitory computer readable storage medium storing a set of program instructions installed on and executed by a computer. The program instructions includes: acquiring first image data representing a first image and second image data representing a second image, the first image including a first target image showing a part of a target object and the second image including a second target image showing another part of the target object; generating first corrected image data representing a first corrected image by performing, on the first image data, a first tilt correction process in which the first image is rotated by a first rotation angle so as to correct a tilt of the first target image, the first corrected image including a first corrected target image based on the first target image, the first corrected target image including a first slant end with respect to a first direction, the first slant end being slanted with respect to a first end of the first corrected image with respect to the first direction by a first slant angle based on the first rotation angle; identifying a first blank region from the first corrected image, the first blank region being a region in contact with the first slant end, the first blank region including a plurality of first blank-region pixels therein; generating first complemented image data representing a first complemented image by performing, on the first corrected image data, a first complement process in which a plurality of pixel values of the plurality of first blank-region pixels is determined using a plurality of pixel values of a plurality of pixels that is located in a first complement target image and along the first slant end, the first complement target image being one of the first corrected target image and an image based on the first corrected target image, the first complemented image including the first complement target image and a first complement image formed by the plurality of first blank-region pixels in the first blank region; and generating arranged image data representing an arranged image by using the first complemented image data, wherein, in the arranged image, an first arrangement target image and a second arrangement target image are arranged to represent the target object, the first arrangement target image being one of the first complement target image and an image based on the first complement target image, the second arrangement target image being one of the second target image and an image based on the second target image, the first arrangement target image including an end corresponding to the first slant end as an end with respect to a direction from the first arrangement target image to the second arrangement target image.

According to still another aspects, the disclosure provides a non-transitory computer readable storage medium storing a set of program instructions installed on and executed by a computer. The program instructions includes: acquiring first image data representing a first image and second image data representing a second image, the first image including a first target image showing a part of a target object and the second image including a second target image showing another part of the target object; determining a relative position between a first arrangement target image and a second arrangement target image so that the first arrangement target image and the second arrangement target image are arranged with a gap therebetween, the first arrangement target image being one of the first target image and an image based on the first target image, the second arrangement target image being one of the second target image and an image based on the second target image; and generating arranged image data representing an arranged image in which the first arrangement target image and the second arrangement target image are arranged according to the relative position. The generating includes: selecting a target pixel from among a plurality of interpolating pixels located on the gap; and determining a pixel value of the target pixel by using at least one pixel value of at least one pixel, each of the at least one pixel satisfying a condition that a pixel is a peripheral pixel in a specific region located peripheral the target pixel and a condition that a pixel is one selected from a group consisting of a pixel in the first arrangement target image, a pixel in the second arrangement target image, and an interpolating pixel whose pixel value has already been determined before the current target pixel is selected.

BRIEF DESCRIPTION OF THE DRAWINGS

The particular features and advantages of the disclosure as well as other objects will become apparent from the following description taken in connection with the accompanying drawings, in which:

FIG. 3 is a sequence of operations performed by the image processing system for an image generation service according to the first embodiment;

FIG. 14 is a flowchart illustrating an arrangement position determination process according to the first embodiment;

FIG. 20 is a flowchart illustrating an interpolating pixel generation process according to a second embodiment;

FIGS. 21(A) and 21(B) are explanatory diagrams illustrating the interpolating pixel generation process according to the second embodiment;

FIGS. 23(A) and 23(B) are explanatory diagrams illustrating the interpolating pixel generation process according to the third embodiment.

DETAILED DESCRIPTION

A. First Embodiment

A-1: Structure of an Image Processing System

Figure 1:
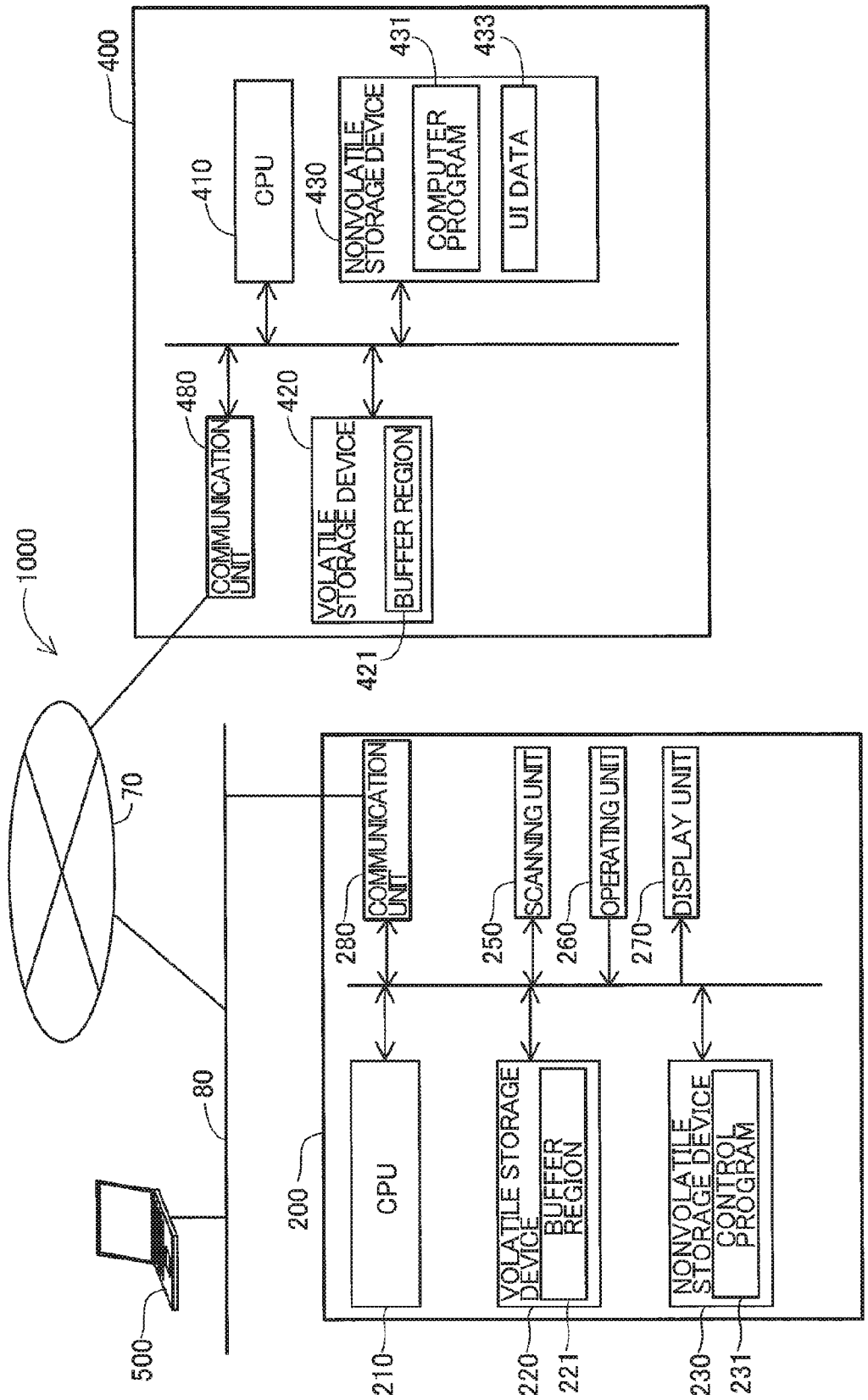
FIG. 1 is a block diagram showing a structure of an image processing system according to a first embodiment.

FIG. 1 is a block diagram showing a structure of an image processing system 1000 according to a first embodiment. The image processing system 1000 has a server 400 functioning as an image processing apparatus, and a scanner 200. The server 400 is connected to an Internet 70. The scanner 200 is also connected to the Internet 70 via a local area network (LAN) 80. Consequently, the server 400 and the scanner 200 can communicate with each other via the LAN 80 and the Internet 70. Further, a personal computer 500 possessed by the user of the scanner 200 may be connected to the LAN 80.

The server 400 includes a CPU 410, as an example of a processor, for processing data, a volatile storage device 420 such as DRAM, a nonvolatile storage device 430 such as a hard disk drive or flash memory, and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, and user interface (UI) data 433.

The computer program 431 and the UI data 433 are installed on the server 400 by an administrator of the server 400, for example, by uploading this data to the server 400 through the Internet 70. Alternatively, the computer program 431 and the UI data 433 may be supplied on a DVD-ROM or other storage media and installed on the server 400 by the administrator. The CPU 410 executes the computer program 431 to implement an image process described later.

The scanner 200 includes a CPU 210 as an example of a scanner processor, for processing data, a volatile storage device 220 such as DRAM, a nonvolatile storage device 230 such as flash memory or a hard disk drive, a scanning unit 250, an operating unit 260 such as a touchscreen, buttons, or the like, a display unit 270 such as a liquid crystal display, and a communication unit 280 for communicating with external devices. The communication unit 280 includes an interface for connecting to the LAN 80 or another network, and an interface for connecting to a USB memory or another external storage device, for example.

The volatile storage device 220 is provided with a buffer region 221 that temporarily stores various data generated when the CPU 210 performs processes. The nonvolatile storage device 230 stores a control program 231. The control program 231 is pre-stored in the nonvolatile storage device 230 when the scanner 200 is manufactured. Alternatively, the control program 231 may be provided by being downloaded from an external server (for example, the server 400) via the Internet 70 or may be provided on a CD-ROM or other storage media.

The scanning unit 250 is adapted to produce scan data representing a color or grayscale image. The scanning unit 250 is provided with a conveying unit 20 and a sensor unit 30.

The CPU 210 is adapted to control the scanner 200 by executing the control program 231. For example, the CPU 210 can control the scanning unit 250 to execute a scan process. Further, the CPU 210 can use service provided by the server 400 through access to the server.

Figure 2:
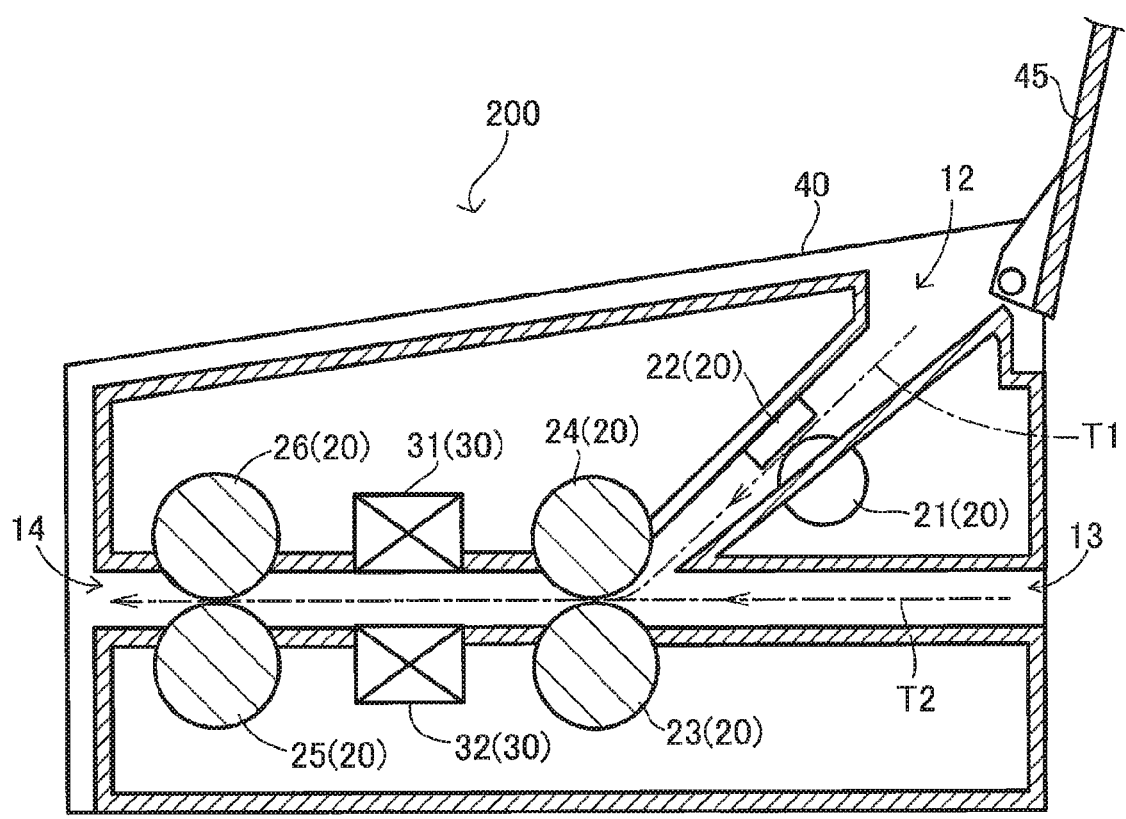
FIG. 2 is a schematic view illustrating a configuration of a scanner according the first embodiment.

FIG. 2 is a schematic view illustrating a configuration of the scanner 200. The scanner 200 includes a casing 40 having a box shape, a cover 45, the conveying unit 20, and the sensor unit 30. The cover 45 is provided at a rear end portion of an upper wall of the casing 40 (right side in FIG. 2). The cover 45 is pivotally movable so as to cover and open an inner space of the casing 40. When the cover 45 opens, the cover 45 functions as a tray on which an original is placed. The casing 40 is formed with an upper inlet port 12, an outlet port 14, and an inlet port 13. The casing 40 includes a first conveying path T1 and a second conveying path T2 therein. The first conveying path T1 extends from the upper inlet port 12 to the outlet port 14 so that an original is conveyed along the first conveying path T1 from the upper inlet port 12 to the outlet port 14. The second conveying path T2 extends from the lower inlet port 13 to the outlet port 14 so that an original is conveyed along the second conveying path T2 from the lower inlet port 13 to the outlet port 14. The first conveying path T1 and the second conveying path T2 join at a joined position located upstream of the sensor unit 30 in a conveying direction. The first conveying path T1 and the second conveying path T2 share a common path that is located downstream of the joined position in the conveying direction.

The conveying unit 20 is adapted to convey originals on the sheet-to-sheet basis along the first conveying path T1 or the second conveying path T2. The conveying unit 20 includes a feed roller 21, a separation pad 22, a pair of first conveying rollers 23 and 24, and a pair of second conveying rollers 25 and 26.

The sensor unit 30 has a first image sensor 31 and a second image sensor 32. The first and second image sensors 31 and 32 are optical sensors, such as a CCD (Charge Coupled devices) sensor or CMOS (Complementary Metal-Oxide Semiconductors) sensor, and are adapted to read an original conveyed by the conveying unit 20 using photoelectric conversion elements arranged in a line. The first image sensor 31 reads an image on a first side of an original (a top surface of the original) and the second image sensor 32 reads an image on a second side of the original (a bottom surface of the original).

The scanning unit 250 can read both sides of the original (the first and second sides) at a time and generate scan data representing the image of the first side and scan data representing the image of the second side.

A-2: Operations of the Image Processing System

FIG. 3 shows a sequence of operations performed by the image processing system 1000 for an image generation service. The scanner 200 initiates the process shown in FIG. 3 in response to a command from the user to use the image generation service provided by the server 400. This service will be described later in greater detail and entails generating arranged image data representing an arranged image. Here, the arranged image shows a single target object (an original 10, for example) by arranging a plurality of scanned images represented by a plurality of sets of scan data. As will be described later in greater detail, the plurality of sets of scan data is generated when the scanning unit 250 performs a plurality of passes to read an original that is larger than the maximum size that the scanning unit 250 can read in one pass, for example.

In S5 at the beginning of the process in FIG. 3, the CPU 210 of the scanner 200 transmits a service initiation request to the server 400. In response to this request, the CPU 410 of the server 400 selects UI data required for providing the image generation service from the UI data 433 shown in FIG. 1, and in S10 transmits this UI data to the scanner 200. The UI data specifically includes screen data representing a user interface screen (hereinafter called a "UI screen"), and control data. The control data includes various data required for the scanner 200 to perform a prescribed process, such as the scan process described later in S15, using the UI screen. For example, the control data includes data that the scanner 200 needs when performing processes that the scanner 200 should execute. One example of such data is a destination address for the image data. The processes that the scanner 200 should execute includes a process of S20 to transmit an image file to the server 400.

In S15 the CPU 210 executes the scan process (hereinafter called a "reading process") to generate a plurality of sets of scan data on the basis of the UI data received in S10. In the embodiment, the CPU 210 generates two sets of scan data. Each set of scan data generated in the embodiment is RGB image data that includes RGB component values (each value indicating one of 256 gradations between 0 and 255, for example) for each pixel in the image. Hereinafter, the RGB component values are referred to as an R value, a G value, and a B value.

Figure 4A:
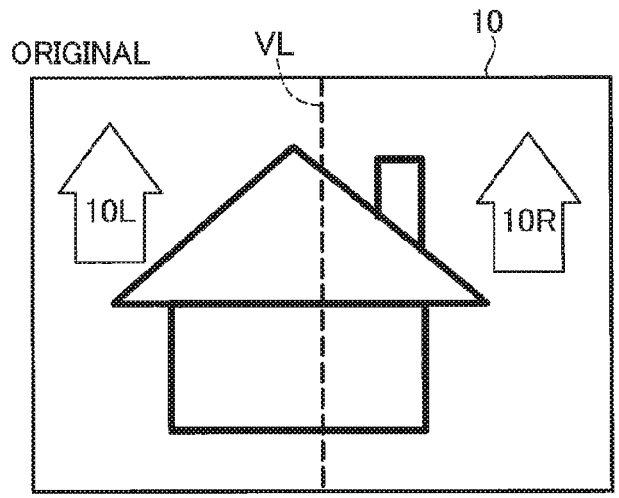
FIG. 4(A) is a view showing an example of an original used in the first embodiment.
Figure 4B:
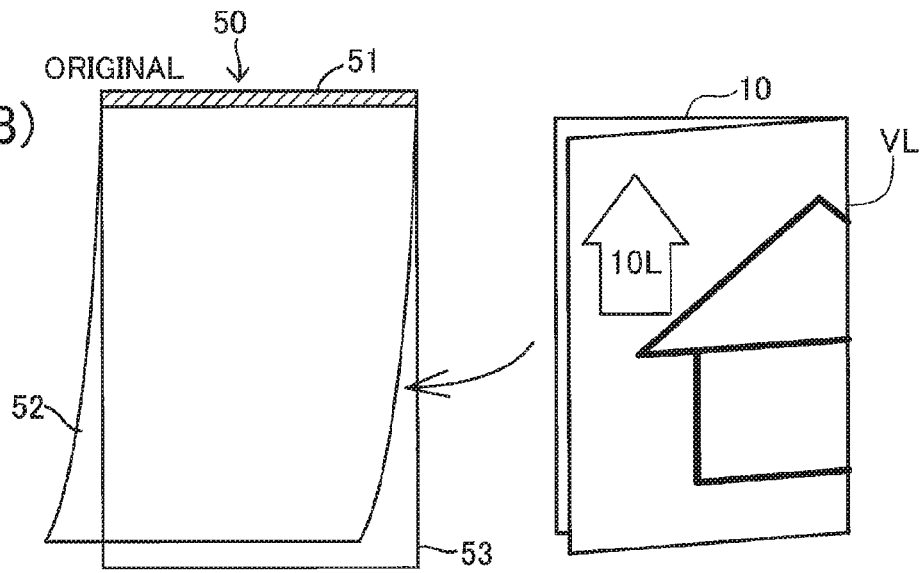
FIGS. 4(B) and 4(C) are views showing the folded original accommodated in a carrier sheet.
Figure 4C:
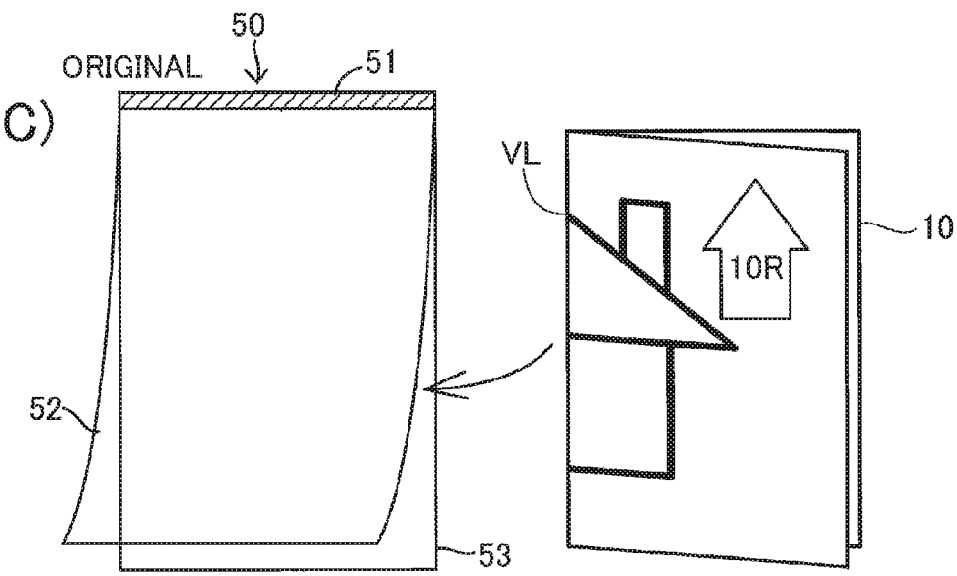

FIGS. 4(A) to 4(C) are explanatory diagrams illustrating states of an original in the scan process. FIG. 4(A) shows one example of an original used in the embodiment. In the embodiment, the size of the original 10 is A3. The original 10 includes a left region 10L and a right region 10R. The left region 10L and the right region 10R are divided by a vertical line VL. That is, the line VL is positioned at a center in a longitudinal direction of the original 10 and parallel to a short side of the original 10. The left region 10L is substantially a left-half region of the original 10, and thus positioned at left side of the line VL. The right region 10R is substantially a right-half region of the original 10, and thus right side of the line VL. The size of the left region 10L and the size of the right region 10R are A4. The A3-size and the A4-size are paper sizes defined by ISO (International Organization for Standardization) 216.

Arrows in the regions 10L and 10R in the FIGS. 4(A)-4(C) show the positions and directions of images in the regions 10L and 10R. That is, in the drawings, the images in the regions 10L and 10R are arranged at the positions where the arrows are placed, and arranged in the directions specified by the arrows. In the embodiment, the arrows indicate upward directions of the images.

The original 10 is folded in half by the line VL so that the image in the right region 10R is depicted in one side of the folded original 10 and the image in the left region 10L is depicted in another side of the folded original 10. The folded original 10 is placed in a carrier sheet 50 as illustrated in FIGS. 4(B) and 4(C).

The carrier sheet 50 includes two transparent sheets 52 and 53 and a band portion 51. The transparent sheets 52 and 53 has a size and a rectangular shape identical to each other. The band portion 51 binds the short sides (upper sides in FIG. 4) of the two sheets 52 and 53 that are overlapped with each other. The carrier sheet 50 accommodates the original 10 with the sheets 52 and 53 pinching the original 10 therebetween.

Lengths of the longitudinal sides of the sheets 52 and 53 are substantially the same as the length of the A4 size in the longitudinal direction (297 mm). Lengths of the short sides of the sheets 52 and 53 are substantially the same as the length of a letter size in the short side direction (215.9 mm). Here, the letter size is defined by ANSI/ASME (American National Standards Institute/American Society of Mechanical Engineers) Y14.1. The carrier sheet 50 can accommodate an unfolded document 10 having the A4 size or the letter size. The carrier sheet 50 can also accommodate the half-folded original 10 whose original size (a size when unfolded) is A3.

The original 10 is accommodated in the carrier sheet 50 in two different states. One state is shown in FIG. 4(B) where the left region 10 L is the top surface that is read by the first image sensor 31. Another state is shown in FIG. 4(C) where the right region 10R is the top surface that is read by the first image sensor 31.

The carrier sheet 50 accommodating the original 10 is placed in the upper inlet 12 with the band portion 51 set as downstream end (leading end) in the conveying direction. The conveying unit 20 conveys the carrier sheet 50 along the first conveying path T1 in response to the user's start instruction. The first image sensor 31 reads an image for the top surface of the original 10 in the carrier sheet 50 conveyed along the first conveying path T1 and generates first scan data. The second image sensor 32 reads an image for the bottom surface of the original 10 in the carrier sheet 50 and generates second scan data. As described above, the original 10 is accommodated in the carrier sheet 50 in one of the two states. When the original 10 is read in the one state, the first scan data represents an image in the left region 10L and the second scan data represents an image in the right region 10R. Hereinafter, this combination of the first scan data and the second scan data is referred to as a first pattern. Alternatively, when the original 10 is read in the another state, the first scan data represents the image in the right region 10R and the second scan data represents the image in the left region 10L. Hereinafter, this combination of the first scan data and the second scan data is referred to as a second pattern.

Figure 5A:
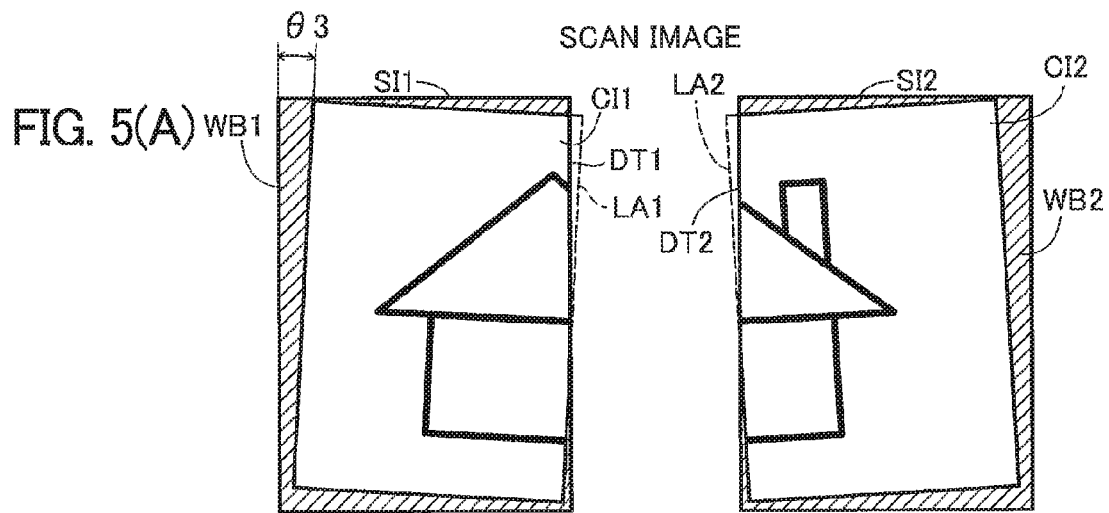
FIG. 5(A) is a view showing scan images used in the first embodiment.
Figure 5B:
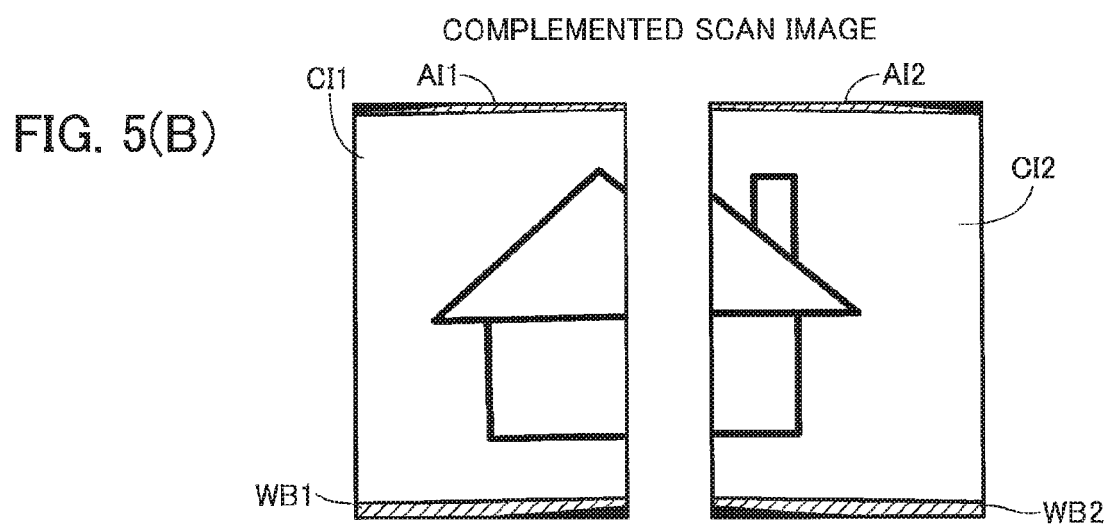
FIG. 5(B) is a view showing tilt corrected scan images used in the first embodiment.
Figure 5C:
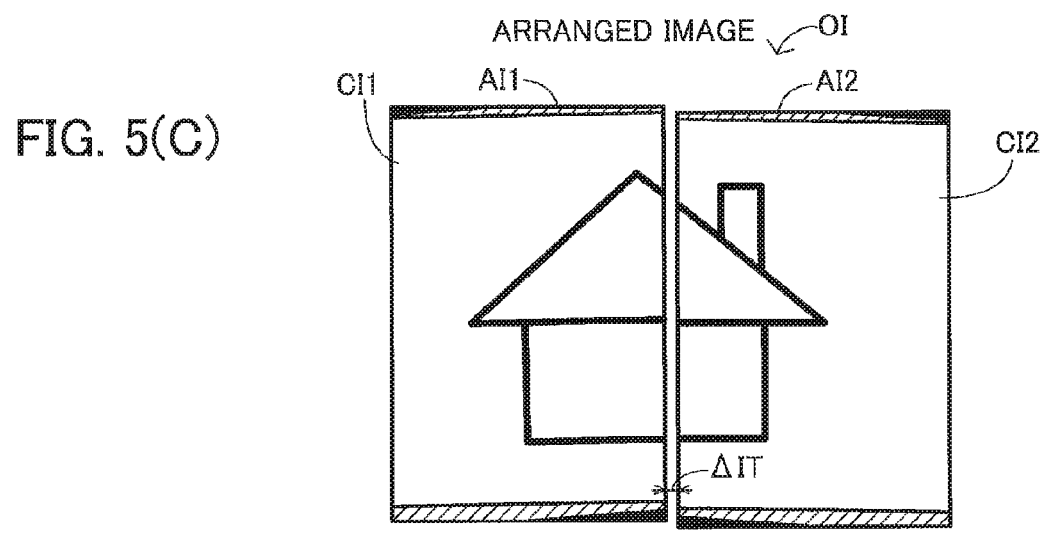
FIG. 5(C) is a view showing arranged image in the first embodiment.

FIGS. 5(A)-5(C) show images processed in the embodiment. FIG. 5(A) shows a first scan image SI1 represented by the first scan data and a second scan image SI2 represented by the second scan data. The first scan image SI1 includes a first original image CI1 and a blank image WB1. The second scan image SI2 includes a second original image CI2 and a blank image WB2. FIG. 5(A) shows an example of images represented by two sets of scan data in the first pattern. That is, the first original image CI1 represents an image in the left region 10L and the second original image CI2 represents an image in the right region 10R.

In the first scan image SI1, the first original image CI1 is tilted with respect to an outer side edge of the first scan image SI1 because the original 10 is tilted relative to the carrier sheet 50 and/or a side edge of the carrier sheet 50 is tilted with respect to the conveying direction. The second original image CI2 is tilted with respect to an outer side edge of the second scan image SI2 because of the same reason as the first original image CI1.

The first original image CI1 does not represent an entire image of the left region 10L. That is, the first original image CI1 lacks an upper right portion LA1. Similarly, the second original image CI2 does not represent an entire image of the right region 10R. The second original image CI2 lacks a upper left portion LA2. This is because a center portion of the carrier sheet 50 in a direction orthogonal to the conveying direction is shifted from a center portion of the image sensor 31 and a center portion of the image sensor 32 in the orthogonal direction. By the shifting, an end of the carrier sheet 50 in the orthogonal direction (or, the end of the folded original 50 in the orthogonal direction) is positioned outside of reading regions of the image sensors 31 and 32. As shown in FIG. 5(A), the portions LA1 and LA2 have long narrow triangular shapes because the original images CI1 and CI2 are tilted as described above. The first original image CI1 includes an end DT1 corresponding to an end of the lacked portion LA1. The end DT1 coincides with a right end of the first scan image SI1. Three ends other than the end DT1 in the first original image CI1 do not coincide with corresponding end of the first scan image SI1, and are tilted with respect to the respective ends of the first scan image SI1. Similarly, the second original image CI2 includes an end DT2 corresponding to an end of the lacked portion LA2. The end DT2 coincides with a left end of the second scan image SI2. Three ends other than the end DT2 in the second original image CI2 do not coincide with corresponding ends of the second scan image SI2, and are tilted with respect to the respective ends of the second scan image SI2.

In the scan process S15, the first scan data and the second scan data are converted in an image file of a prescribed file format, such as JPEG (Joint Photographic Experts Group) format.

In S20 of FIG. 3, the CPU 210 transmits an image file of the first scan data (referred to as a first image file) and an image file of the second scan data (referred to as a second image file) to the server 400. Accordingly, in S25 the CPU 410 of the server 400 receives the first and second image files. The CPU 410 obtains the first and second scan data from the respective image files and stores the first and scan data in the buffer region 421. When the image files are in the JPEF format for example, each scan data is obtained from the image file by a prescribed conversion process converting data in the image file into RGB image data.

In S30, the CPU 410 performs a tilt correction process on the first scan data and the second scan data, and generates first tilt corrected scan data and second tilt corrected scan data, respectively. More specifically, the CPU 410 performs well-known processes, such as a Hough transformation process and an edge detection process, on the first and second scan data and detects upper ends of the original images CI1 and CI2 appearing in the scan images SD and SI2. The CPU 410 determines rotation angles of the scan images SD and SI2 so that the upper ends of the original images CI1 and CI2 are parallel to the respective upper ends of the scan images SI1 and SI2. The CPU 410 produces tilt corrected scan data by rotating the scan images SI1 and SI2 by the determined rotation angles. That is, the CPU 410 rotates the scan images SI1 and SI2 by determined rotational angles and generates two sets of tilt corrected scan data representing two tilt corrected scan images. Here, the CPU 410 may detect lower ends of the original images CI1 and CI2 instead of the upper ends. However, it is preferable that detection of right ends or left ends of the original images CI1 and CI2 is not performed instead of that of the upper ends or the lower ends. This is because there is a possibility that the right end DT1 of the first original image CI1 and the left end DT2 of the second original image CI2 lack the respective portions LA1 and LA2 and thus do not represent actual ends of the folded original 10. In other words, the left and right ends of the first original image CI1 and the second original image CI2, such as the ends DT1 and DT2 coincide with the corresponding ends of the scan images SI1 and SI2, and thus cannot be used in the tilt correction process. Put another way, the CPU 410 can properly perform the tilt correction process by using ends of the original images CI1 and CI2 that do not coincide with any ends of the scan images SI1 and SI2.

The tilt correction process can restrain situations in which tilted arranged images are used in an arranged image when arranged image data is generated.

Through the processes S35-S45 shown in FIG. 3, the CPU 410 performs a series of preprocesses. The preprocesses includes a blank removal process in S35, residual blank identification processes A and B in S40 and S42, and a complement process in S45. The series of preprocesses is performed to remove a blank region of an left end or an right end from each of the two tilt corrected scan images (the blank removal process), and to form complement images in residual blank regions that cannot be removed in the blank removal process.

The CPU 410 generates first complemented scan data representing a first complemented scan image AI1 and second complemented scan data representing a second complemented scan image AI2, by performing the preprocesses S35-S45. FIG. 5(B) shows examples of the complemented scan images AI1 and AI2. As shown in FIG. 5(B), the processed scam images AI1 and AI2 respectively include blank regions WB1 and WB2 at upper and lower ends thereof. However, the complemented scan image AI1 does not include a blank region at a left end and a right end thereof, and the complemented scan image AI2 does not include a blank region at a left end and a right end thereof. This is because blank regions of the left end and the right end are removed and complement images are formed for residual blank regions at the left end and the right ends through the preprocesses S35-S45.

In S50, the CPU 410 performs a pixel restoration process to restore missing pixels in the complemented scan images AI1 and AI2 (or, the original images CI1 and CI2). The scan images SI1 and SI2 are generated by reading the half-folded original 10 as shown in FIGS. 4(B) and 4(C). Accordingly, an image in a very narrow area located on the line VL of the original 10 appears neither on the original image CI1 nor on the original image CI2, and the images are missing. Images restored in the pixel restoration process represents an image in the very narrow area on the line VL of the original 10. The pixel restoration process will be described late in detail.

In S55 the CPU 410 executes an arrangement position determination process. The arrangement position determination process is for determining a relative position of the two processed images AI1 and AI2, that is, a relative position of the two original images CI1 and CI2. The arrangement position determination process will be described later in detail.

In S60 the CPU 410 performs an arranged image generation process. The arranged image generation process is for generating arranged image data representing an arranged image OI where the two complemented scan images AI1 and AI2 (or, the two original images CI1 and CI2) are arranged, using the first processed scan data and the second processed scan data. FIG. 5(C) shows an example of the arranged image OI. In the arranged image OI, the two original images CI1 and CI2 are arranged at the relative position. Accordingly, the CPU 410 generates the arranged image data representing the arranged image OI that shows the original 10 shown in FIG. 4(A) on the basis of the two original images CI1 and CI2.

The CPU 410 converts the generated arranged imaged data into a prescribed image file format, and thus generates an arranged image file representing the arranged image. For example, the arranged image data in a RGB data format is compressed into JPEG format. As a result, the arranged image file is generated in the JPEG format. The arranged image file may be generated from the arranged image data in a PDF format.

In S65, the CPU 410 transmits the generated arranged image file to the scanner 200. The CPU 210 of the scanner 200 receives the arranged image file, and stores the received arranged image file in the non-volatile storage device 230. The CPU 210 also notifies a user that the arranged image file has been received. The arranged image file will be used by the user. For example, in response to a command from the user, the arranged image OI will be printed using the arranged image file.

A-3. Blank Removal Process

Figure 6:
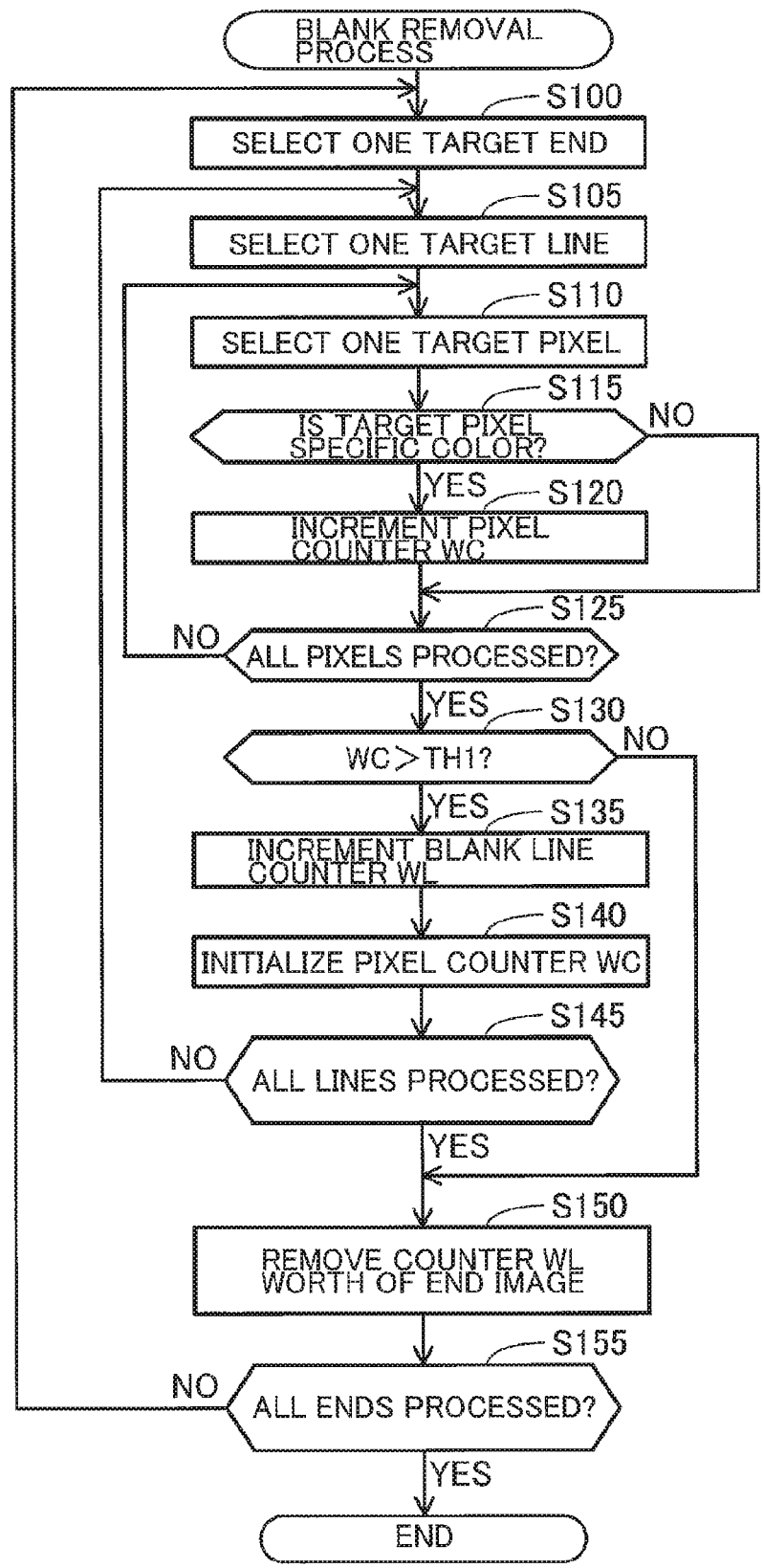
FIG. 6 is a flowchart illustrating a blank removal process according to the first embodiment.

FIG. 6 is a flowchart illustrating details of the blank removal process shown in S35. The blank removal process is for removing blank regions located in the subject images on the line-to-line basis along the respective ends.

Figure 7:
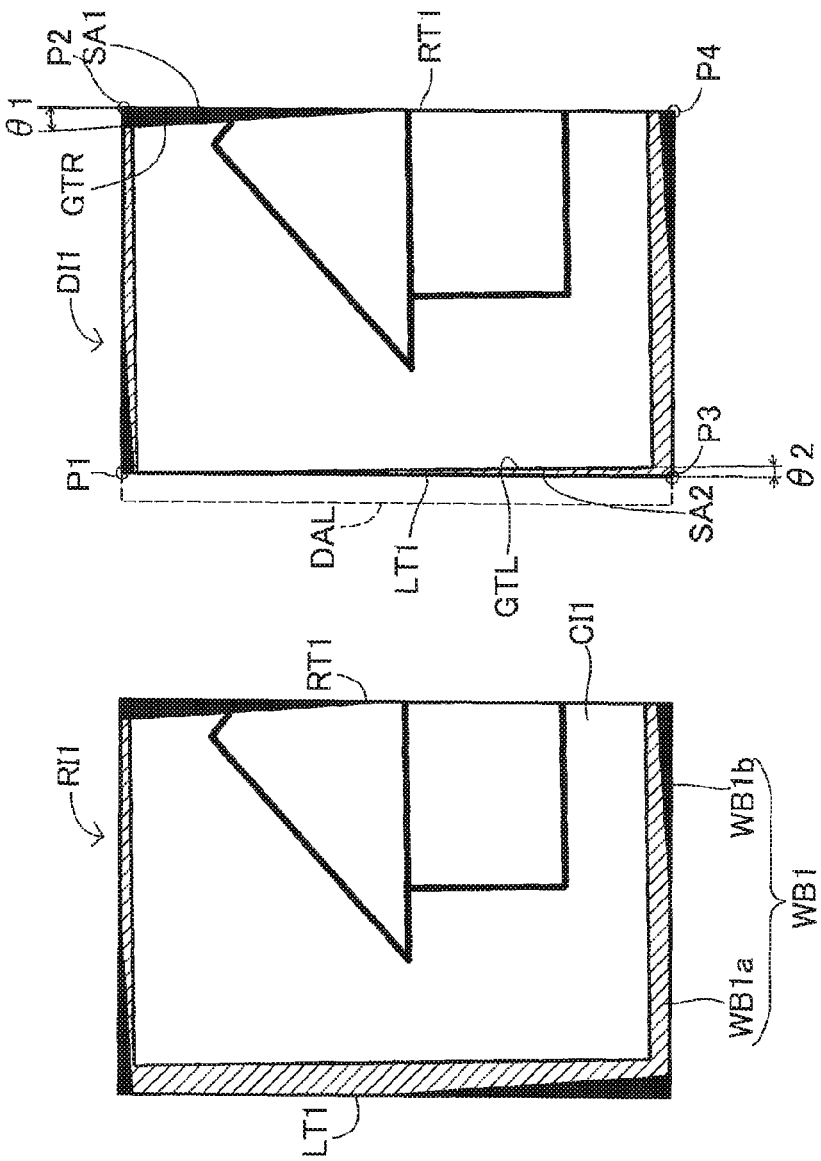
FIG. 7(A) is a view showing an example of the tilt corrected scan image.
FIG. 7(B) is a view showing an example of a blank removed scan image.
FIG. 7(C) is a view showing an example of a complemented scan image.

In S100 the CPU 410 selects one target end from the subject ends. In the embodiment, the subject images for the process are two tilt corrected scan images on which the tilt correction process of S30 is performed. The subject ends for the process are four ends, that is, both left end and right end of the two subject images (or the two tilt corrected scan images). FIGS. 7(A)-7(C) show examples of scan images on which the preprocesses are performed. FIG. 7(A) shows a first tilt corrected scan image RI1 represented by the first tilt corrected scan data generated by performing the tilt correction process on the first scan data. The first tilt corrected scan image RI1 includes the first original image CI1 and the blank image WB1. The tilt of the first original image CI1 in the first scan image SI1 shown in FIG. 5(A) is corrected in the first original image CI1 in the first tilt corrected scan image shown in FIG. 7(A). The blank image WB1 in the first tilt corrected scan image RI1 includes an original blank image WB1a corresponding to the blank image WB1 in the first scan image SD and an additional blank image WB1b added in the tilt correction process. As shown in FIG. 7(A), the original blank image WB1a is indicated by hatching, and the additional blank image WB1b is indicated by black areas. The scan image is rotated about its gravity center in the tilt correction process according to the embodiment. A shape and size of the tilt corrected scan image are the same as those of the scan image before the tilt correction process. Accordingly, a part of ends in the first scan image SI1 is removed in the tilt correction process and the additional blank image WB1b is included in the first blank-removed scan image through the tilt correction process. The original blank image WB1a represents a first specific color, specifically, color of opposing portions of the image sensors 31 and 32 in the scanner. In the embodiment, the color of the original blank image WB1 is grey. The additional blank image WB1b represents a second specific color, specifically, a color indicated by a prescribed pixel value. In the embodiment the pixel value indicates white. A longitudinal length and short side length of the first tilt corrected scan image RI1 are the same as those of the first scan image SI1.

Though not shown in the drawings, the second tilt corrected scan data representing a second tilt corrected scan image RI2 is generated by performing the tilt correction process on the second scan data. The second tilt corrected scan image RI2 includes the second original image CI2, and an blank image WB2 similar to the first tilt corrected scan image RI1. The blank image WB2 includes an original blank image, and an additional blank image.

The tilt corrected image RI1 includes a right end RT1 and a left end LT1. In S100 the CPU 410 selects one of the ends RT1 and LT1 as the target end. Hereinafter, a target scan image indicates one of the tilt corrected scan images in which the target end is included.

In S105 the CPU 410 selects one target line from among a plurality of vertical lines in the target scan image. Here, each of the plurality of vertical lines extends in a vertical direction and includes pixels arranged in the vertical direction. The plurality of vertical lines has the same position in a vertical direction. The initially selected vertical line is positioned on the right end RT1. The CPU 410 sequentially selects one of the plurality of consecutive vertical lines as the target line according to an order advancing in an inward direction from the target end to an inside of the first tilt corrected scan image RI1. When the target end is the right end RT1, the inward direction is a leftward direction whereas when the target end is the left end LT1, the inward direction is a rightward direction.

In S110 the CPU 410 select a target pixel from among a plurality of pixels included in the target line. For example, the CPU 410 sequentially selects the target pixel from a top end pixel to a bottom end pixel in the target line.

In S115 the CPU 410 determines whether the target pixel represents a specific color that the blank image should represent. In other words, the CPU 410 determines whether the target pixel is a specific color pixel representing one of the first specific color and the second specific color. When the target pixel includes pixel values (RGB values) is in a specific range indicating the specific color, the CPU 410 determines that the target pixel is the specific color pixel. When the target pixel includes the pixel values out of the specific range, the CPU 410 determines that the target pixel is a non-specific color represent a color different from the specific color.

When the target pixel is the specific color pixel (S115: YES), the CPU 410 increments a pixel counter WC by 1. The pixel counter is for counting the number of the specific color pixel in the target line. When the target pixel is the non-specific color pixel, the CPU 410 skips S120.

In S125 the CPU determines whether all pixels in the target line are processed as the target pixel. When there is an unprocessed pixel (S125: NO), the CPU 410 returns to S110 and selects a next unprocessed pixel as the target pixel. When all pixels are processed (S125: YES), the CPU 410 determines whether the pixel counter WC is greater than a prescribed threshold value TH1. The threshold value TH1 is set to 70% of the number of pixels in the target line (the number of pixels in one vertical line).

When the pixel counter WC is greater than the threshold value TH1, the target line is a blank line constituting the blank image. When the pixel counter WC is greater than the threshold value TH1 (S130: YES), the CPU 410 proceeds to S135. When the pixel counter WC is smaller than or equal to the threshold value TH1, the target line is determined not to be the blank line. When the pixel counter WC is smaller than or equal to the threshold value TH1 (S130: NO), the CPU 410 proceeds to S150.

In S135 the CPU 410 increments a blank line counter WL by 1. The blank line counter is for counting the number of the blank lines. In S140 the CPU 410 initializes the pixel counter WC to zero. In S145 the CPU 410 determines whether all lines subject for determination are processed as the target line. Here, the lines subject for determination include prescribed number of lines successively arranged from the target end in a direction from the target end to inside of the first tilt corrected scan image RI1. The prescribed number of lines includes a line on the target end. The prescribed number of lines is 80 lines when the resolution of scan image is 300 dpi in the horizontal direction, for example. When there is an unprocessed line that is subject for determination (S145: NO), the CPU 410 returns to S105 and selects a next line as a new target line. When the current target end is on the right end, the new target line is a line located left side of and adjacent to (in contact with) the current target line. When the current target end is on the left end, the new target line is a line located right side of and adjacent to (in contact with) the current target line. When all the lines subject for determination are processed (S145: YES), the CPU 410 proceeds to S150. Because the prescribed number of lines is set to a sufficiently large value so that the target line can reach an end of the original image CI1, the process usually proceeds to S150 from S130 when the target line is set on the end of the original image CI1. Thus, it will not happen that all the lines subject for the determination are processed except irregular cases such as a case where the target scan image does not include an original image.

In S150 the CPU 410 removes, as a blank image, the blank line counter WL worth of an end image from the target scan image. The blank line counter WO worth of the end image is number of successive vertical lines equivalent to the blank line counter WL from the target end. FIG. 7(B) shows an example of a first blank removed scan image DI1 obtained through the blank removal process on the target scan image, that is, the first tilt corrected scan image RI1 shown in FIG. 7(A). When the target end is the left end LT1 of the first tilt corrected scan image RI1, an end region DAL indicated by the dashed line in FIG. 7(B) is removed in S150. When the target end is the right end RT1 of the first tilt corrected scan image RI1, an blank image (an end region) is not detected in the blank removal process and thus no region is removed from the scan image RI1. However, there is a possibility that both left and right end regions are removed from another example of a tilt corrected scan image.

In S155 the CPU 410 determines whether all subject ends are selected as the target end. When there is an unprocessed end (S155: NO), the CPU 410 returns to S100 and selects an unprocessed end as a new target end. When the all the subject ends are processed (S155: YES), the CPU 410 ends the blank removal process. As shown in FIG. 7(B), a plurality of lines along the subject end is specified and removed from the first corrected image subject for the process. Each of the removed lines (blank lines) extends in a direction (vertical direction) orthogonal to a direction (a left-right direction) in which the subject end is located, the each of the removed lines (blank lines) is an entire line extending in a direction (vertical direction) parallel to the subject end in the subject image, and the each of the removed lines (blank lines) is determined to constitute a blank image in the subject image.

The CPU 410 generates first blank removed scan data representing the first blank removed scan image DI1 as a result of the blank removal process shown in FIG. 7(A). The CPU 410 also generates second blank removed scan data representing the second blank removed image DI2 by removing an end region of the left end and/or an end region of the right end from the second tilt corrected scan image RI2.

A-4. Residual Blank Identification Process A

The residual blank identification process A in S40 (FIG. 3) will be explained. There is a possibility that a residual blank is remained at a left end and/or a right end of the blank removed scan image after the blank removal process. For example, as shown in FIG. 7(B), the blank removed scan image DI1 includes residual blank regions (or residual blank images) SA1 and SA2 at the right end RT1 and the left end LT1 thereof, respectively. The first original image CI1 in the first blank removed scan image DI1 includes a slant end GTR as an end in the right direction. The residual blank region SA1 is a region adjacent to (in contact with) the slant end GTR. The slant end GTR is slanted with respect to the right end RT1 by an angle θ1. Here, the first scan image SI1 is rotated by the angle θ1 in the tilt correction process. The slant end GTR corresponds to an end of the lacked portion LA1 missing in the first original image CI1 (FIG. 5(A)). Before the tilt correction is performed, an end corresponding to the slant end GTR is coincident with the right end of the first scan image SI1. The residual blank region SA1 is a part of the additional blank image WB1b added in the tilt correction process. A region corresponding to the residual blank region SA1 does not exist in the first scan image SI1 before the tilt correction process. The residual blank region SA1 is located outside of the original image CI1 in the blank removed scan image DI1. The residual blank region SA1 has a long narrow triangular shape extending in a vertical direction in contact with a left or right end in the blank removed scan image (the right end in the example shown in FIG. 7(B)). The residual blank identification process A is for identifying the residual blank SA1.

Figure 8:
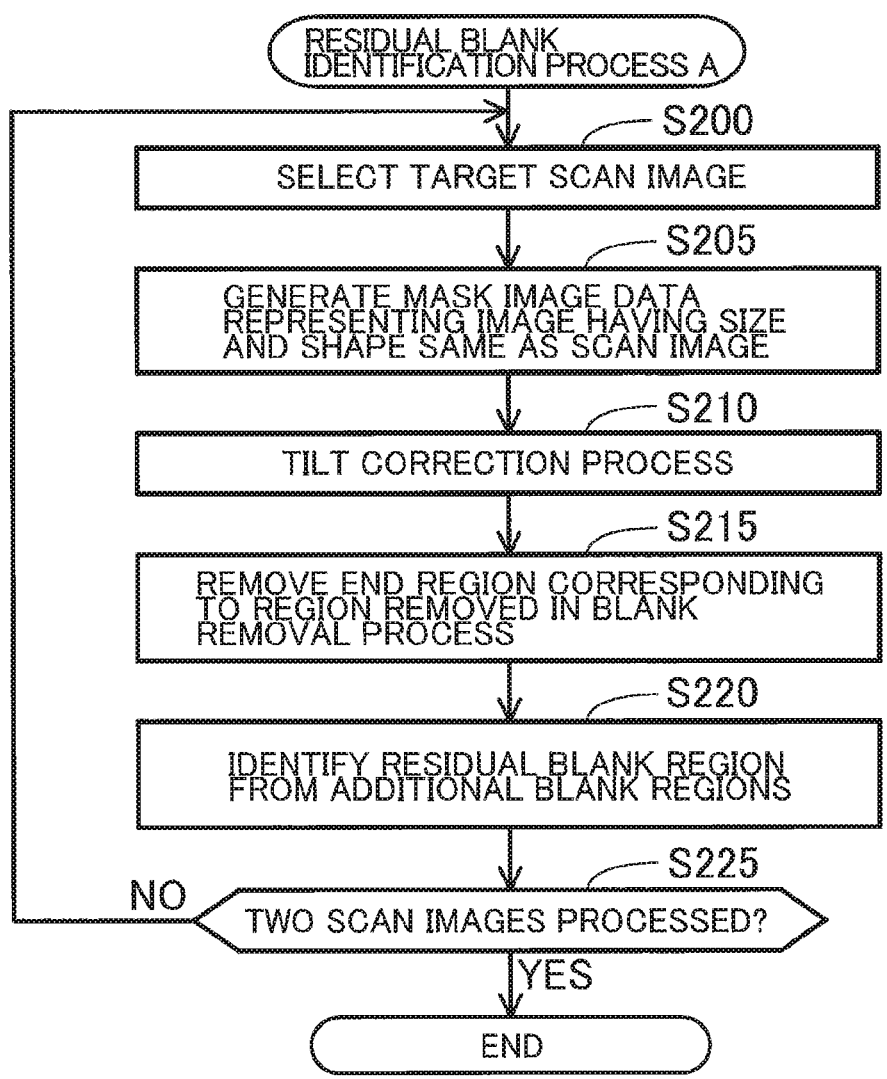
FIG. 8 is a flowchart illustrating a residual blank identification process A according to the first embodiment.
Figure 9:
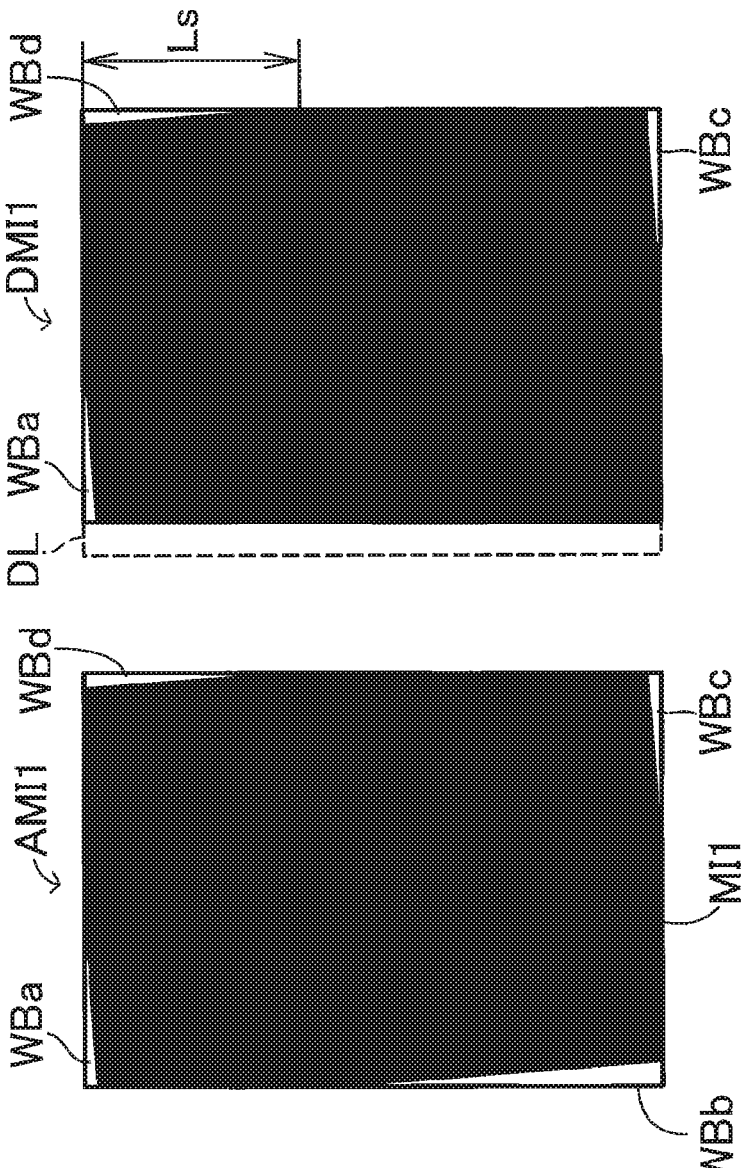
FIG. 9(A) is a view showing an example of a mask image.
FIG. 9(B) is a view showing an example of a tilt corrected mask image.
FIG. 9(C) is a view showing an example of a blank removed mask image.

FIG. 8 is a flowchart illustrating the residual blank identification process A. FIGS. 9(A)-9(C) are explanation diagrams for illustrating the residual blank identification process A. In S200 the CPU 410 selects a target scan image from among the two blank removes scan imaged DI1 and DI2. The following description explains in a case where the first blank removed scan image DI1 is selected as the target scan image. The similar process is also executed when the blank removed second scan image DI2 is selected as the target scan image.

In S205 the CPU 410 generates first mask image data representing a first mask image MI1. The first mask image MI1 has a rectangular shape and a size identical to the first blank removed scan image DI1. FIG. 9(A) shows the first mask image MI1. The first mask data is binary data in which all pixel values are set to "ON", for example.

In S210 the CPU 410 performs a process identical to the tilt correction process that was performed on the first scan image SI1 in S20 (FIG. 3), and then generates first tilt corrected mask data representing a first tilt corrected mask image AMI1. That is, the CPU 410 rotates the mask image MI1 about its gravity center by the angle θ1. The CPU 410 removes, from the rotated mask image MI1 regions outside of a rectangular region defined by an entire region of the blank removed scan image DI1 before the tilt correction process. Because of the tilt correction process, blank regions are generated outside the rotated mask image MI1 and inside the first tilt corrected mask image AMI1. The CPU 410 sets the blank regions to additional blank images WBa-WBd, respectively. The CPU 410 sets pixel values in the additional blank images WBa-WBd to "OFF". Accordingly, pixels constituting the first mask image MI1 are distinguished from pixels constituting the additional blank images WBa-WBd in the first tilt corrected mask image AMI1. FIG. 9(B) shows the first tilt corrected mask image AMI1. A black part in FIG.

9(B) indicates pixels constituting the first mask image MI1 and white pixel parts indicate pixels constituting the additional blank image WBa-WBd.

The tilt corrected mask image AMI1 includes an end region DL (FIG. 9(C)) having a size identical to that of the end region DAL (FIG. 7(B)). Here, the end region DAL was removed from the first tilt corrected scan image RI1 in S35 of the blank removal process shown in FIG. 2. In S215 the CPU 410 removes the end region DL from the first tilt corrected mask image AMI1. FIG. 9(C) shows a blank removed mask image DMI1 with the end region DL removed.

In S220 the CPU 410 identifies the residual blank region SA1 by using the additional blank image WBa, WBc, and WBd in the first blank removed mask image DMI1 that are remained after the process S215. Specifically, the CPU 410 specifies an blank image (or blank images) from among the additional blank image WBa, WBc, and WBd, that satisfies (or satisfy) both a condition that the blank image includes a contact portion in contact with the right end or the left end of the blank removed mask image DMI1, and a condition that a length (or the number of pixels) of the contact portion in the vertical direction is larger than a reference length Ls (FIG. 9(C)). The CPU 410 identifies, as the residual blank region SA1, a region that satisfies a condition that the region is in the target blank removed scan image, and a condition that the region coincide with the specified blank image when the blank removed scan image is overlapped with the mask image MI. The reference length Ls is 30%-50% of the vertical length of the first blank removed mask image DMI1, for example. When the CPU 410 cannot identify any blank image satisfying the above conditions, the residual blank region SA1 is not identified in S220.

In S225 the CPU 410 determines whether both of the blank removed scan images DI1 and DI2 are processed. When there is an unprocessed scan image (S225: NO), the CPU 410 returns to S200 and selects the unprocessed scan image as the target scan image. When the both of the blank removed scan images DI1 and DI2 are processed (S225: YES), the CPU 410 ends the residual blank identification process A. Accordingly, the residual blank regions in the two blank removed scan images are identified. The residual blank region SA1 shown in FIG. 7(B) is identified in the blank removed scan image DI1, for example. Though not shown in the drawings, residual blank regions are identified in the second blank removed scan image DI2 similarly to the first blank removed scan image DI1.

When neither the portions LA1 nor LA2 is missed in the two blank removed scan images DI1 and DI2, the blank removed scan images do not include a residual blank region. In this case, no residual blank region is identified through the residual blank identification process A. Pixels in the residual blank region are referred to as blank pixels.

A-5. Residual Blank Identification Process B

The residual blank identification process B in S42 (FIG. 3) will be explained. There is a possibility that another type of residual blank is remained at a left end and/or a right end of the blank removed scan image after the blank removal process. For example, as shown in FIG. 7(B), a type of the residual blank region SA2 at left side is different from that of the residual blank region SA1 at right side. The original image CI1 in the blank removed scan image DI1 has a slant end GTL as a left end. The slant end GTL is slanted from the left end LT1 by an angle θ2. The residual blank region SA2 is adjacent to (in contact with) the slant end GTL. The angle θ2 is an absolute value of a difference between the angle θ1 and an angle θ3 (θ2=|θ1-θ3|). The first scan image SI1 is rotated by the angle θ1 (FIG. 7(B)). As shown in FIG. 5(A), the angle θ3 is an actual slant angle of a left end in the first original image CI1 with respect to the left end of the first scan image SI1. That is, the left end of the original image CI1 in the first scan image SI1 is slanted from the left end of the first scan image SD by the angle θ3. In the tilt correction process, the angle θ1 is set so as to coincide with the angle θ3. However, the actual angle θ3 is not completely coincident with the rotation angle θ1 used in the tilt correction process by an error. Accordingly, the slant end GTL is slanted with respect to the left end LT1 in the blank removed scan image DI1 by the angle θ2. Similarly to the residual blank region SA1, the residual blank region SA2 has a long narrow triangular shape extending in a vertical direction in contact with a left or right end in the blank removed scan image (the left end in the example shown in FIG. 7(B)). The residual blank identification process B is for identifying the residual blank SA2.

Figure 10:
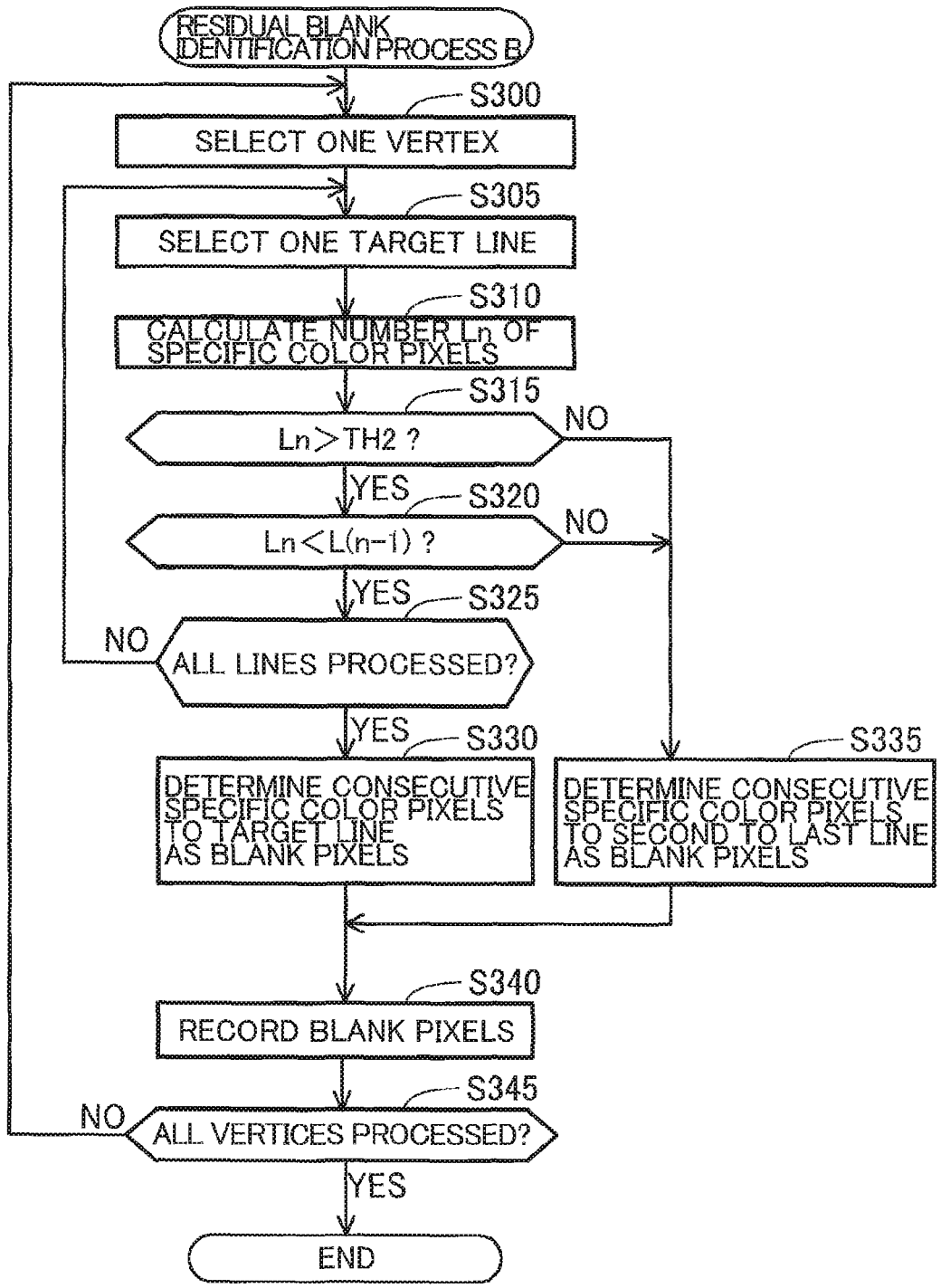
FIG. 10 is a flowchart illustrating a residual blank identification process B according to the first embodiment.

FIG. 10 is a flowchart illustrating the residual blank identification process B. In S300 the CPU 410 select one vertex from among four vertices in the first blank removed scan image DI1 and four vertices in the second blank removed scan image DI2 (eight vertices in total). As shown in FIG. 7(B), the first blank removed scan image DI1 includes four vertices P1-P4, for example. Hereinafter, a target scan image indicates one of the blank removed scan images DI1 and DI2 in which the target vertex is included.

In S305 the CPU 410 selects one target line from among a plurality of vertical lines in the target scan image. An initial target line is positioned on a target end. The target end is one of the left and right ends of the target scan image where the target vertex is positioned. For example, when the target vertex is an upper right vertex P2 of the first blank removed scan image DI1 shown in FIG. 7(B), the initial target line is positioned on the right end of the first blank removed scan image DI1. The CPU 410 sequentially selects one of the plurality of consecutive vertical lines as the target line according to an order advancing an inward direction from the target end to an inside of the first blank removed scan image DI1. When the target vertex is the vertex P2 or P4, the inward direction is a leftward direction whereas when the target vertex is the vertex P1 or P3, the inward direction is a rightward direction.

In S310 the CPU 410 calculates the number of specific color pixels consecutively arranged in the target line from the target vertex in a direction toward an opposite vertex located in the target line (hereinafter, simply referred to as the number Ln). When the target vertex is upper vertex P1 or P2, the number Ln indicates the number of the specific color pixels consecutively arranged from the upper end toward the lower side. The specific color pixel has the first specific color, that is the color of the original blank image WB1$a$ in the residual blank identification process B.

In S315 the CPU 410 determines whether the calculated number Ln is greater than a prescribed threshold value TH2. The prescribed threshold value TH2 is set to 10 pixels, for example. When the number is greater than the threshold value TH2 (S315: YES), there is a possibility that the specific color pixels in the target line constitute the residual blank region SA2 subject for identification. In this case, the CPU 410 proceeds to S320. When the number Ln is lower than or equal to the threshold value TH2, the CPU 410 determines that the specific color pixels on the target line do not constitute the residual blank region SA2 and proceeds to S335.

In S320 the CPU 410 determines whether the currently calculated number Ln is smaller than the previously calculated number L(n−1). As described above, the residual blank region SA2 has the long narrow triangular shape in contact with the left or right end of the blank removed scan images DI1 or DI2 (the left end in the example of FIG. 7(B)). Accordingly, when the specific color pixels in the target line constitute the residual blank region SA2, the number Ln gradually decreases as the target line goes away from the target end (the left or right end of the blank removed scan image).

Accordingly, when the number Ln is smaller than the number L(n−1) (S320: YES), the specific color pixel in the target line constitute the residual blank region SA2. Thus, the CPU 410 proceeds to S325 in order to process a next target line. When the number Ln is larger than or equal to the number L(n−1) (S320: NO), the specific color pixels in the target line do not constitute the residual blank region SA2, the CPU 410 proceeds to S335 without processing a next target line.

In S325 the CPU 410 determines whether all lines subject for determination are processed as the target line. The lines subject for determination includes a line on the target end and includes prescribed number of lines consecutively arranging in a direction going away from the target end. The prescribed number is 10 lines in the residual blank identification process B when the target scan image has a resolution 300 dpi in the horizontal direction. When there is an unprocessed line subject for determination (S325: NO), the CPU 410 returns to S305 and selects a next target line. The next target line is a line located left side and adjacent to (in contact with) the current target line when the target end is right end. The next target line is a line located right side and adjacent to (in contact with) the current target line when the target end is left end. When all the lines subject for determination are processed (S325: YES), the CPU 410 proceeds to S330. Because the prescribed number of lines are set to a sufficiently large value so that the negative determination can be made in S315 or S320, all the lines subject for determination are not processed in usual cases.

In S330 the CPU 410 determines that the specific color pixels consecutively arranged between the current target line and a line on the target end are blank pixels constituting the residual blank region SA2.

In S335 the CPU 410 determines that the specific color pixels consecutively arranged between a line on the target end and a second-to-last target lint (that is, a line preceding by one line from the current target line) are blank pixels constituting the residual blank region SA2. That is, the specific color pixels are included in lines that have been selected as the target line except the current target line.

When the number Ln of the initial target line is smaller than or equal to the threshold value TH2, the CPU 410 determines that there is no blank pixel and does not determines the blank pixel constituting the residual blank region in S335.

In S340 the CPU 410 records the blank pixels determined in S330 or S335 in the volatile storage device 420, for example. The CPU 410 prepares mask image data having a shape and size identical those of the target scan image, and records the blank pixels in the mask image data.

In S345 the CPU 410 determines whether four vertices in each of the two blank removed scan images DI1 and DI2 (eight vertices in total) are processed as the target vertex. When there is an unprocessed vertex (S345: NO), the CPU 410 returns to S300 and selects an unprocessed vertex as the new target vertex. When all the vertices are selected (S345: YES), the CPU 410 ends the residual blank identification process B. The residual blank region SA2 shown in FIG. 7(B) is identified in the blank removed scan image DI1 through the residual blank identification process B, for example. Though not illustrated in drawings, a residual blank region is identified in the second blank removed scan image DI2 similarly to the first blank removed scan image.

Figure 11:
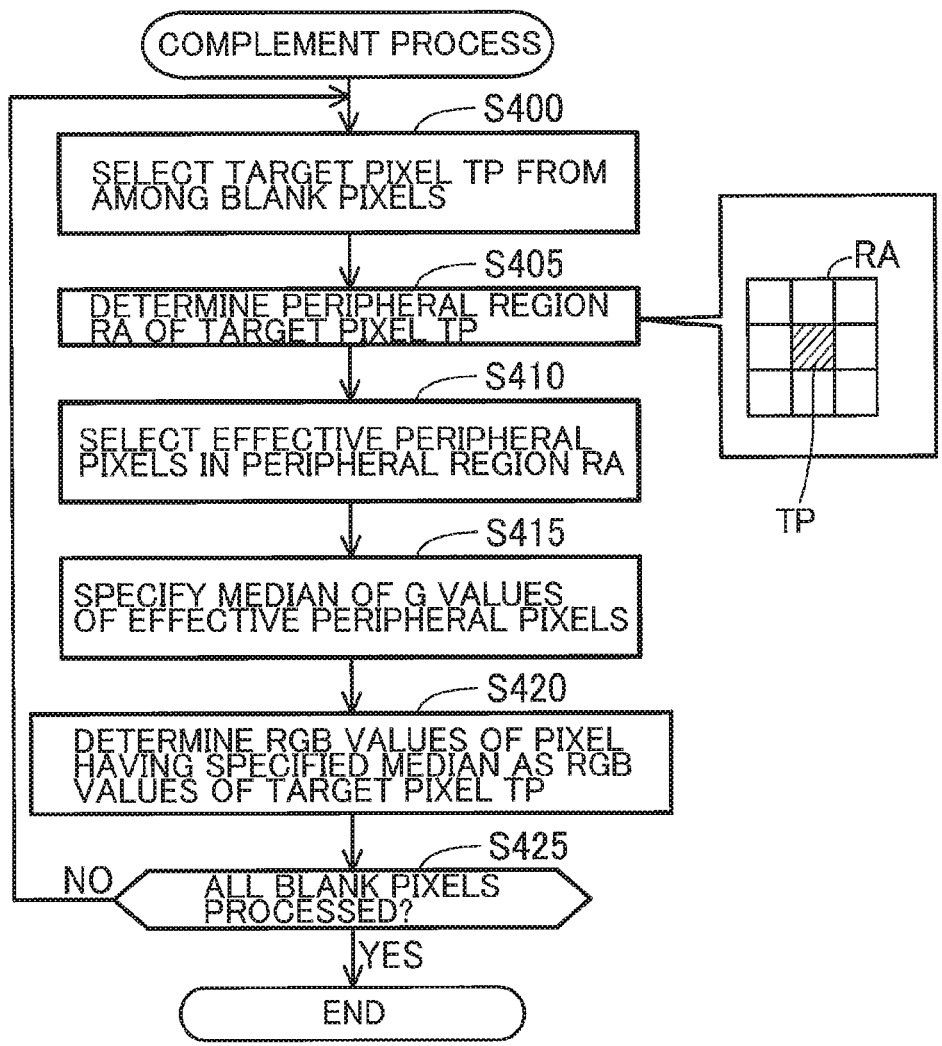
FIG. 11 is a flowchart illustrating a complement process according to the first embodiment.

The complement process S45 shown in FIG. 3 will be explained. The complement process is for forming complement images in the residual blank regions SA1 and SA2 identified in the residual blank identification processes A and B using pixels in the original images CI1 and CI2 along the slant ends GTR and GTL. FIG. 11 is a flowchart illustrating the complement process.

In S400 the CPU 410 selects a target pixel TP from among pixels constituting the residual blank regions SA1 and SA2 identified in the blank removed scan images DI1 and DI2 in the residual blank identification processes A and B. The target pixel TP is sequentially selected from among a plurality of blank pixels in a blank image in an order from a pixel closest to the original image (CI1 or CI2) in the blank removed scan image (DI1 or DI2).

In S405 the CPU 410 sets a peripheral region RA of the target pixel TP. As shown in FIG. 11 the peripheral region RA are defined by a plurality of pixels surrounding the target pixel TP. Specifically, the peripheral region is a rectangular region including vertical 3 pixels×horizontal 3 pixels and having the target pixel TP as the center of the rectangular region.

In S410 the CPU 410 selects at least one effective peripheral pixel having effective pixel value from among eight pixels in the peripheral region except the target pixel TP. Each effective peripheral pixel is one of a pixel constituting the original image (CI1 or CI2) and a blank pixel whose pixel value has already been determined in the complement process. In other words, each effective peripheral pixel is one of pixels in the blank removed scan images DI1 and DI2 other than the blank pixels whose pixel values are not determined. Because the target pixel TP is sequentially selected from among a plurality of blank pixels in a blank image in an order from a pixel closest to the original image (CI1 or CI2) in the blank removed scan image (DI1 or DI2), the peripheral region includes at least one effective peripheral pixel.

In S415 the CPU 410 specifies a pixel whose pixel value of Green (G value) is a median of G values among the selected at least one effective peripheral pixel. In S420 the CPU 410 determines the RGB values of the specified pixel in S415 as the RGB values of the target pixel TP. Alternatively, the CPU 410 may specify a pixel whose pixel value other than Green is a median of the corresponding pixel values other than the Green among the selected at least one effective peripheral pixel, and may determine the RGB values of the specified pixel as the RGB values of the target pixel TP. The pixel value other than Green may be a luminance value, a Red value, or a Blue value.

In S425 the CPU 410 determines whether all the blank pixels in the blank removed scan image (DI1 or DI2) are processed as the target pixel TP. When there is an unprocessed blank pixel (S425: NO), the CPU 410 returns to S400 and selects an unprocessed blank pixel as the target pixel TP. When all the blank pixels are processed (S425: YES), the CUP 410 ends the complement process. Two sets of complemented scan data corresponding to the complemented scan images AI1 and AI2 (FIG. 5(B)) are generated through the complement process. FIG. 7(C) shows the first complemented scan image AI1. As shown in FIG. 7(C), the complement images are formed in the residual regions SA1 and SA2 in the first complemented scan image AI1.

A-7. Pixel Restoration Process

The pixel restoration process S50 shown in FIG. 3 will be explained. The pixel restoration process is for restoring lacked pixels missing in the complemented scan images AI1 and AI2 (that is, the original images CI1 and CI2). Pixels subject for restorations are located on a narrow line corresponding to the folded line VL in the original 10.

Figure 12:
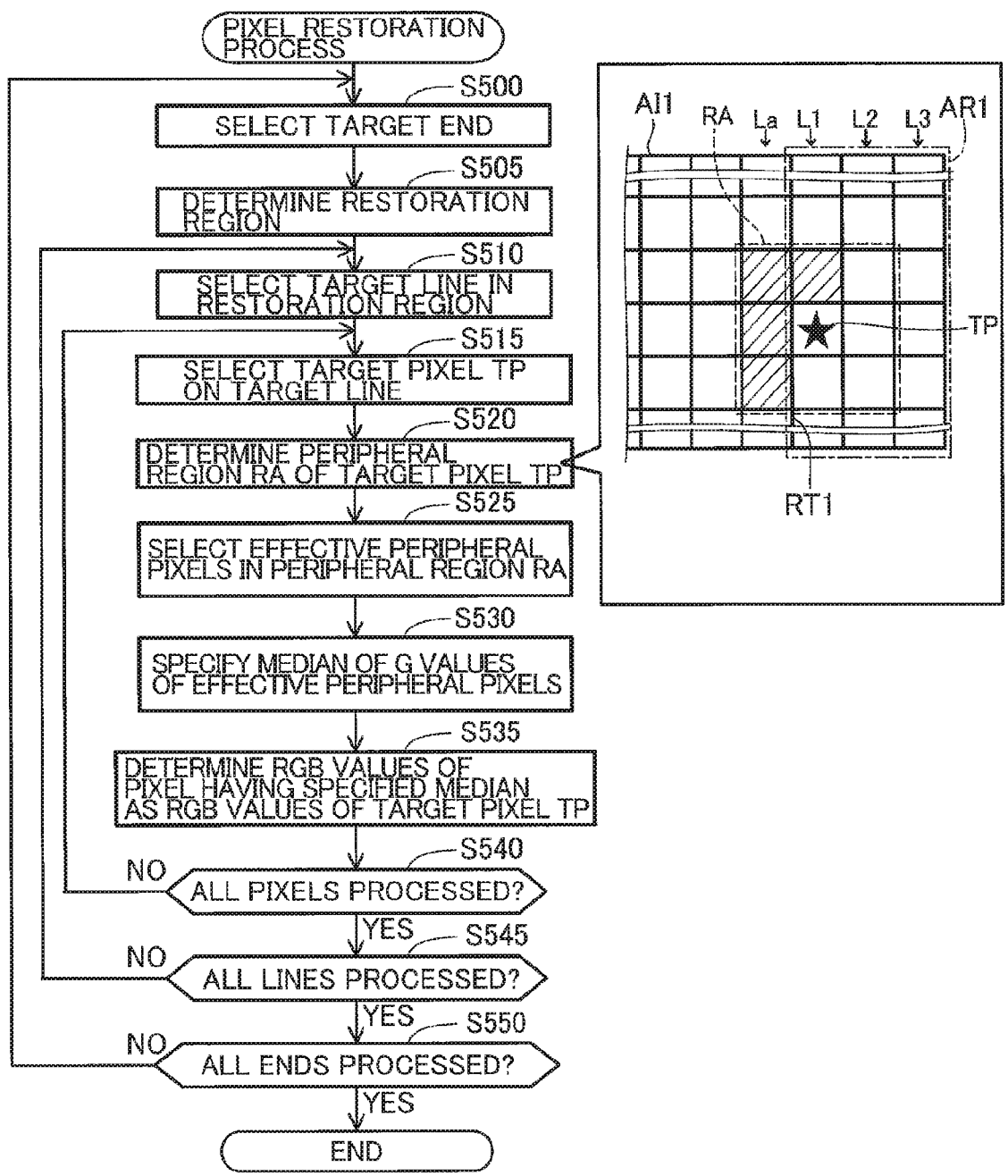
FIG. 12 is a flowchart illustrating a pixel restoration process according to the first embodiment.
Figure 13A:
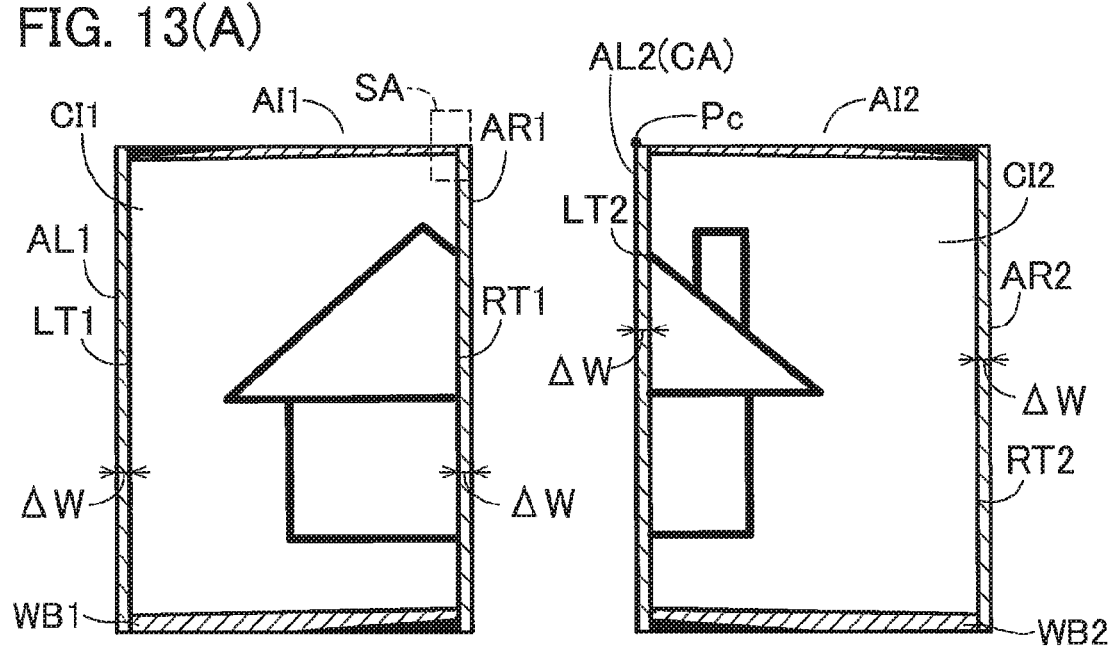
FIG. 13(A) is a view showing complemented scan images according to the first embodiment.
Figure 13B:
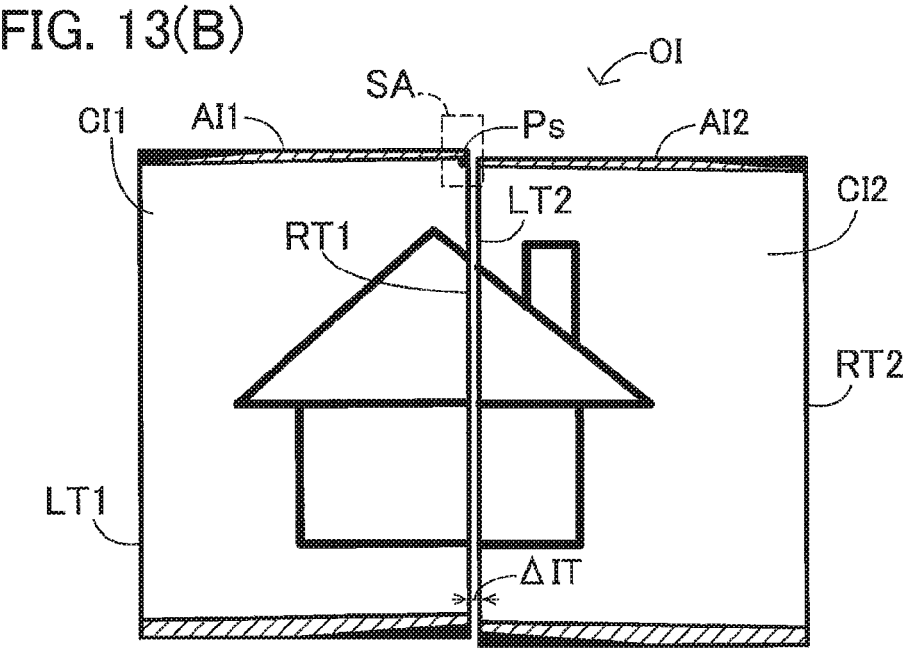
FIG. 13(B) is a view showing an arranged image in which original images are arranged.

FIG. 12 is a flowchart for illustrating the pixel restoration process. FIGS. 13(A) and 13(B) are explanation diagrams for illustrating the pixel restoration process and the arrangement position determination process described later. In S500, the CPU 410 selects a target end from among ends subject for the process. In the embodiment, the ends subject for the process are four ends, that is, the left ends LT1 and LT2 and the right ends RT1 and TR2 in the two complemented scan images AI1 and AI2 shown in FIG. 13(A). A line corresponding to the folded line VL is one of the left and right ends in each complemented scan images. However, at this stage, the CPU 410 cannot determine which end corresponds to the folded line VL. Accordingly, the CPU 410 sets each of the left and right ends as the end subject for the process.

In S505, the CPU 410 sets a restoration region along the target end. FIG. 13(A) shows restoration regions AL1 and AR1 respectively along the left end LT1 and the right end RT1 in the complemented scan image AIL and restoration regions AL2 and AR2 respectively along the left end LT2 and the right end RT2 in the complemented scan image AI2. When the right end RT 1 is the target end for example, the CPU 410 selects the restoration region AR1 along the right end RT1. The selected restoration region is in contact with the target end, is positioned outside of the target end, and has a narrow liner region extends in and along an entire length of the target end from upper end to the lower end. The width ΔW of the restoration region in the horizontal direction is three pixels, when the horizontal resolutions of the complemented scan images AI1 and AI2 are 300 dpi, for example.

In S510 the CPU 410 selects a target vertical line in the restoration region. Since the width ΔW of the restoration region in the horizontal direction is three pixels, the restoration region has three pixel lines extending in the vertical direction. The CPU 410 sequentially selects one target line out of the three pixel lines from the side closest to the target end. For example, as shown in the right section of FIG. 12, the restoration region AR1 has three lines L1 to L3. In this case, the CPU 410 first selects the line L1 as a target line, secondly the line L2 as a target line, and finally the line L3 as a target line.

In S515, the CPU 410 selects one target pixel TP from among a plurality of pixels included in the target line. For example, the CPU 410 sequentially selects, from top to bottom, a target pixel from among a plurality of pixels included in the target line.

In S520, the CPU 410 sets a peripheral region RA surrounding the target pixel TP. As shown in FIG. 12, the peripheral region RA is determined similarly to the peripheral region RA used in the complement process shown in FIG. 11.

In S525 the CPU 410 selects at least one effective peripheral pixel having peripheral pixel value from among 8 pixels that is pixels in the peripheral region RA except the target pixel TP. Each effective peripheral pixel is one of a pixel constituting the complemented scan image AI1 (or AI2) including the target end (and including the image formed in the complement process) and a pixel whose pixel value has already been determined in the pixel restoration process. As shown in FIG. 12, four pixels indicated by hatching are selected as the effective peripheral pixels, for example.

In S530 the CPU 410 specifies a pixel whose pixel value of Green (G value) is a median of G values among the selected at least one effective peripheral pixel, similarly to S415 shown in FIG. 11. In S535 the CPU 410 determines the RGB values of the specified pixel in S530 as the RGB values of the target pixel TP, similarly to S420 shown in FIG. 11.

In S540 the CPU 410 determines whether all the pixels on the target line have been processed as the target pixel TP. When there is an unprocessed pixel (S540: NO), the CPU 410 returns to S515 and then selects an unprocessed pixel as the target pixel TP. When all the pixels have been processed (S540: YES), in S545 the CPU 410 determines whether all the lines in the restoration region have been processed as the target line. When there is a unprocessed line (S545: NO), the CPU 410 returns to S510 and selects an unprocessed line as the target line. When all the lines have been processed (S545: YES), in S550 the CPU 410 determines whether all the ends subject for the process are processed as the target end. When there is an unprocessed end (S550: NO), the CPU 410 selects an unprocessed end as the target end. When all the ends subject for the process are processed (S550: YES), the CPU 410 ends the pixel restoration process. As shown in FIG. 13(A), a plurality of pixel values in four restoration regions AL1, AR1, AL2, and AR2 are determined through the pixel restoration process.

The restoration regions AL1, AR1, AL2, and AR2 are regions that are adjacent to the complemented scan images AI1 and AI2. However, in the buffer region 421, the image data including the restoration pixels inside the restoration region AL1, AR1, AL2, or AR2 is not necessarily integrated with the image data representing corresponding one of the complemented scan image AI1 and the image data representing the complemented scan image AI2. The image data including the restoration pixels inside the restoration region AL1, AR1, AL2, or AR2 may be separated from both the image data representing corresponding one of the complemented scan image AI1 and the image data representing the complemented scan image AI2.

A-8. Arrangement Position Determination Process

The arrangement position determination process S55 will be explained. The arrangement position determination process is for determining a relative position between the two complemented scan images AI1 and AI2 (or a relative position between the two original images CI1 and CI2) to properly represent the original 10.

FIG. 14 is a flowchart illustrating the arrangement position determination process. In S600 the CPU 410 selects a first arrangement defining that a left image is the first complemented scan image AI1 and a right image is the second complemented scan image AI2. In FIG. 13(A), the complemented scan images AI1 and AI2 are arranged according to the first arrangement. In the first arrangement, the right end RT1 of the first complemented scan image AI1 opposes to the left end LT2 of the second complemented scan image AI2. In S605 the CPU 410 performs a similar region identification process for the first arrangement.

Figure 15:
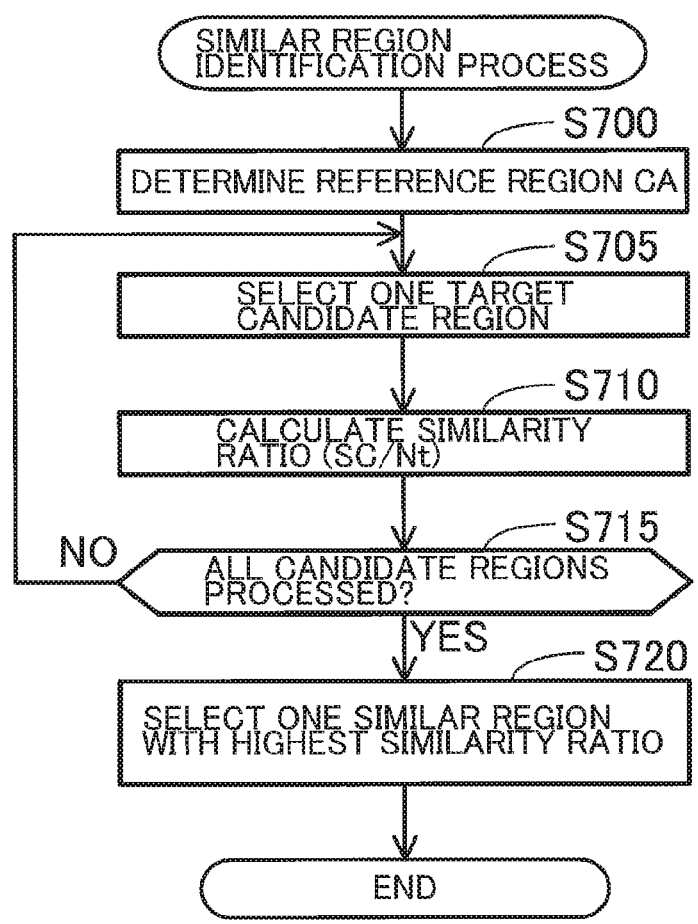
FIG. 15 is a flowchart illustrating a similar region identification process according to the first embodiment.

FIG. 15 is a flowchart illustrating the similar region identification process. In S700 the CPU 410 determines a reference region CA along the left end of the right image.

The reference region CA is set so as to include the entire restoration region along the left end of the right image. According to the first arrangement, the reference region CA is set to the entire restoration region AL2 along the left end LT2 in the second complemented scan image AI2.

In S705, the CPU 410 selects one target candidate region from among a plurality of candidate regions determined on the basis of a predetermined search region SA. For example, as shown in FIG. 13(A), the search region SA is a region indicated by a broken line at the upper right portion of the left image.

Figure 16:
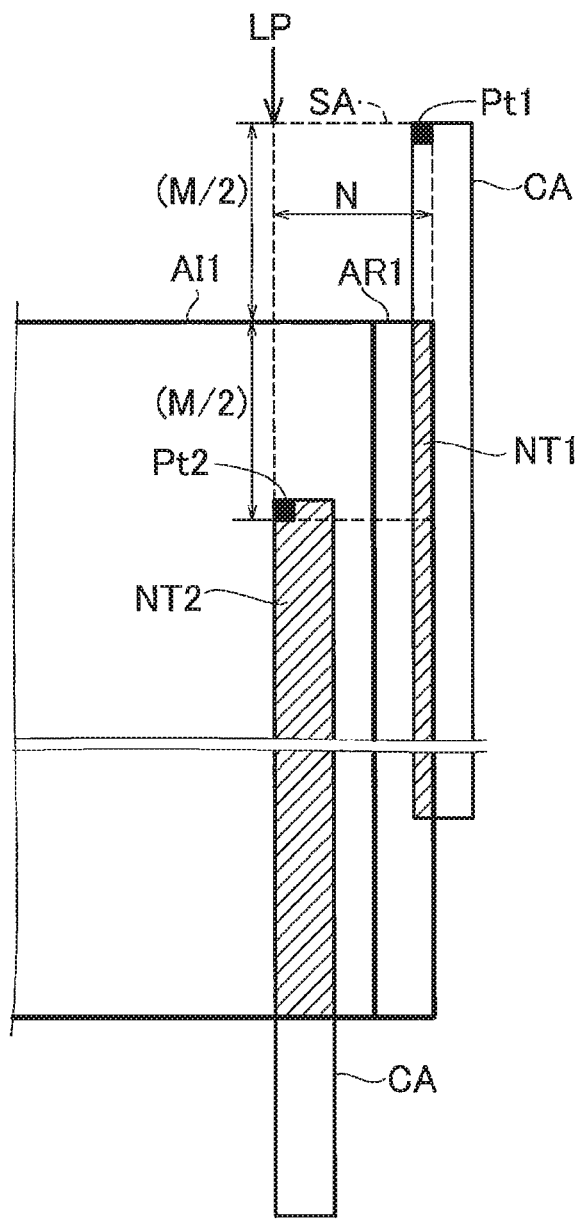
FIG. 16 is an enlarged view of an area surrounding a search region shown in FIG. 13(A)

FIG. 16 is an enlarged view of an area near the search region SA shown in FIG. 13(A). The search region SA is a rectangular region having M pixels (vertical direction)×N pixels (horizontal direction) (M and N are integers greater than or equal to 2). For example, N is about 10, and M is between tens and hundreds. In the example shown in FIG. 16, the right end of the search region SA matches the right end of the restoration region AR1 on the right side of the complemented scan image AI1. The center of the search region SA in the vertical direction is at the upper end of the complemented scan image AI1.

The CPU 410 selects one target pixel position from among the positions of (MxN) pixels inside the search region SA. The CPU 410 identifies, as a target candidate region, a region that is inside the complemented scan image AI1 or the restoration region AR1, and that overlaps with the reference region CA if the reference region CA is disposed so that a pixel Pc (FIG. 13(A)) is positioned at the target pixel position. Here, as shown in FIG. 13(A), the pixel Pc is a pixel in the reference region CA positioned an upper left end thereat. In this manner, the positions of (MxN) pixels inside the search region SA is in one-to-one correspondence with (MxN) candidate regions. For example, a hatched candidate region NT1 in FIG. 16 is identified when an upper-right pixel position Pt1 of the search region SA is at the target pixel position. A hatched candidate region NT2 in FIG. 16 is identified when a lower-left pixel position Pt2 of the search region SA is at the target pixel position.

For example, the target candidate region is initially set to the candidate region NT1 in FIG. 16. The CPU 410 moves the target pixel position in the search region SA on a pixel-to-pixel basis in the vertical or horizontal direction from the pixel Pt1 for identifying the first candidate region NT1 to move the target candidate position sequentially, thereby identifying each target candidate region from among the (MxN) candidate regions. The target pixel position is a position of a pixel in the search region SA for identifying the candidate region.

After one target candidate region is identified, in S710, the CPU 410 calculates a similarity ratio (SC/Nt) of the target candidate region. The similarity ratio (SC/Nt) of the target candidate region is an index value indicating the degree of similarity between the target candidate region and the reference region CA.

The calculation method of the similarity ratio (SC/Nt) will be explained. The CPU 410 selects each of a plurality of pixels in the target candidate region as a target pixel, and determines whether the target pixel is a similar pixel or a non-similar pixel. More specifically, the CPU 410 calculates a difference ΔVP between the component value of the target pixel in the target candidate region and the component value of a pixel in the reference region CA corresponding to the target pixel. The pixel in the reference region CA that corresponds to the target pixel is a pixel in the reference region CA that overlaps with the target pixel when the target candidate region is overlapped with the reference region CA so that the pixel Pc (FIG. 13(A)) is positioned at the target pixel position. Here, the component values of the two pixels from which the difference ΔVP is calculated are (R1, G1, B1) and (R2, G2, B2). The difference ΔVP is represented by the sum of absolute values of differences of three types of component values, for example. That is, the difference ΔVP is the sum of an absolute value of (R1−R2), an absolute value of (G1−G2), and an absolute value of (B1−B2).

If the calculated difference ΔVP is less than or equal to a predetermined reference value TH3, the CPU 410 judges that the target pixel is a similar pixel. If the calculated difference ΔVP is greater than the predetermined reference value TH3, the CPU 410 judges that the target pixel is a non-similar pixel. This is because it can be judged that the color of the target pixel in the target candidate region is similar to the color of the pixel in the reference region CA corresponding to the target pixel when the difference ΔVP is less than or equal to the predetermined reference value TH3. The CPU 410 repeatedly performs the above determination for each pixel in the target candidate region.

The CPU 410 calculates the similarity ratio (SC/Nt) of the target candidate region by dividing the number of similar pixels SC in the target candidate region by the total number of pixels Nt in the target candidate region. The similarity ratio (SC/Nt) is a ratio of the number of similar pixels SC to the total number of pixels Nt in the target candidate region. The larger the similarity ratio (SC/Nt) is, the more the reference region CA is similar to the target candidate region.

In S715 the CPU 410 determines whether all the (MxN) candidate regions have been processed as the target candidate region. When there is an unprocessed candidate region (S715: NO), the CPU 410 returns to S705, and selects an unprocessed candidate region as the target candidate region. When all the candidate regions have been processed (S715: YES), the CPU 410 moves to S720.

In S720 the CPU 410 selects one similar region with the highest similarity ratio (SC/Nt) from among the (MxN) candidate regions.

In S610 shown in FIG. 14 the CPU 410 sets a second arrangement reverse to the first arrangement. That is, the second arrangement defines that a left image is the second complemented scan image AI2 and a right image is the first complemented scan image AI1. In the second arrangement, the left end LT1 of the first complemented scan image AI1 opposes to the right end RT2 for the second complemented scan image AI2. In S615 the CPU 410 performs a similar region identification process of the second arrangement. The similar region identification process performed in S615 is identical to the similar region identification process performed in S605 except that the reference region CA is set to the entire restoration region along the left end LT1 of the first complemented scan image AI1 set as the left image and the search region SA is set to a right end portion of the second complemented scan image AI2 set as the right image.

Prior to the process S620, the similarity ratios (Sc/Nt) of the selected similarity regions are determined for both the first and second arrangements. In S620 the CPU 410 selects one of the first and second arrangements having highest similarity ratio as a selected arrangement. The CPU 410 also selects the similar region having highest similarity ratio that is based on the selected arrangement.

In S625 the CPU 410 sets a relative position between the two complemented scan images AI1 and AI2 on the basis of the position of the selected similar region having a highest similarity ratio and on the basis of the selected arrangement. Specifically, the CPU 410 identifies the pixel position Ps (FIG. 13(B)) in the search region SA corresponding to the selected similar region. For example, when the selected similar region is the candidate region NT1 shown in FIG. 16, the pixel position Pt1 is specified as the pixel position Ps corresponding to the similar region. That is, the pixel position Ps is a pixel position used as the target pixel position identifying the candidate region that is selected as the similar region. The CPU 410 determines that the relative position between the two complemented scan images AI1 and AI2 so that the identified pixel position Ps in the search region SA overlaps with the upper left pixel Pc in the reference region CA.

A-9. Arranged Image Generation Process

The arranged image generation process S60 shown in FIG. 3 will be explained. The arranged image generation process is for generating the arranged image data representing the arranged image OI in which the two complemented scan images AI1 and AI2 (or the original images CI1 and CI2) are arranged.

Figure 17:
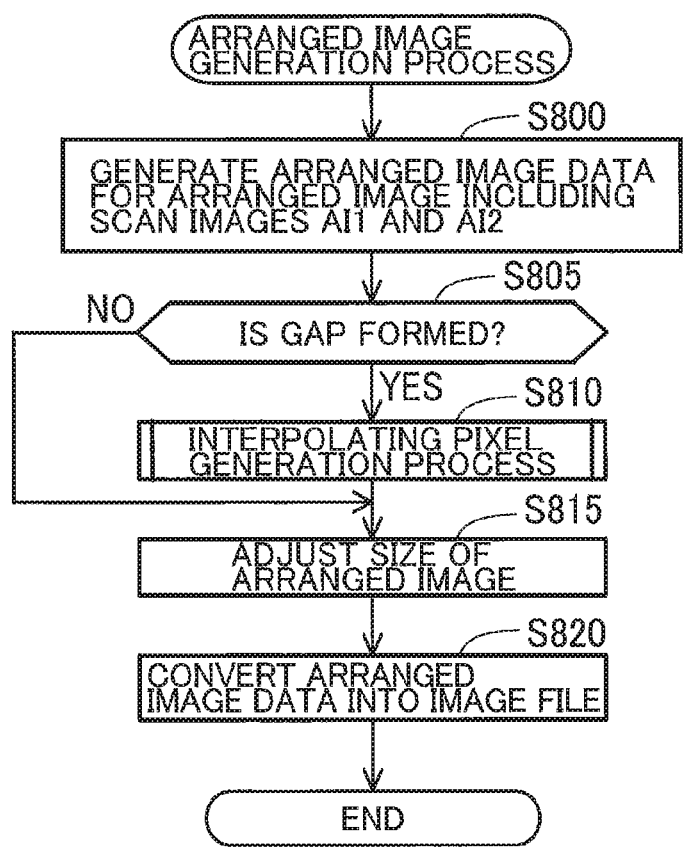
FIG. 17 is a flowchart illustrating an arranged image generation process according to the first embodiment.

FIG. 17 is a flowchart illustrating the arranged image generation process. In S800, the CPU 410 generates arranged image data representing one arranged image where the two complemented scan images AI1 and AI2 have been arranged at the arrangement position determined. FIG. 13(B) shows one example of an arranged image OI1. As shown in FIG. 13(B), the two original images CI1 and CI2 are arranged in the arranged image OI1. The arranged image OI1 represents one original 10 with the two original images CI1 and CI2. The arranged image OI1 includes the complement images formed in the complement process. The arranged image includes none of the restoration region AL1, AL2, AR1, and AR2 generated in the pixel restoration process.

In S805 the CPU 410 determines whether a gap ΔIT (FIG. 13(B)) is formed between the two scan images AI1 and AI2 arranged in the arranged image OI. In the arrangement position determination process, each of the reference region CA and the search region SA includes the restoration region (for example, the restoration region AR1 or AL2). When the two scan images are arranged according to the relative position determined in the arrangement position determination process, there is a possibility that the narrow gap ΔIT (with 1-5 pixels worth of width, for example) is formed between the two scan images AI1 and AI2 arranged in the arranged image OI.

When the gap ΔIT is formed (S805: YES), in S810 the CPU 410 performs an interpolating pixel generation process. The interpolating pixel generation process is for generating RGB values for a plurality of interpolating pixels on the gap ΔIT. When there is no gap ΔIT (S805: NO), the CPU 410 skips S810 because there is no interpolating pixel.

Figure 18:
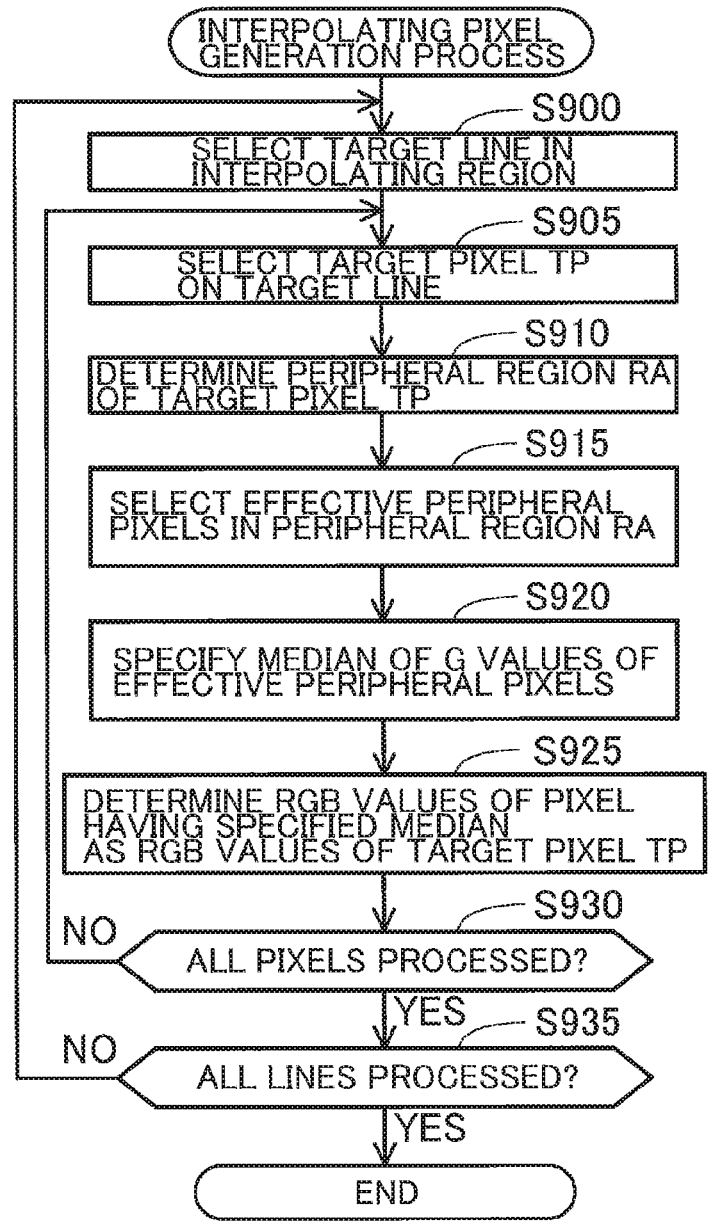
FIG. 18 is a flowchart illustrating an interpolating pixel generation process according to the first embodiment.
Figure 19A:
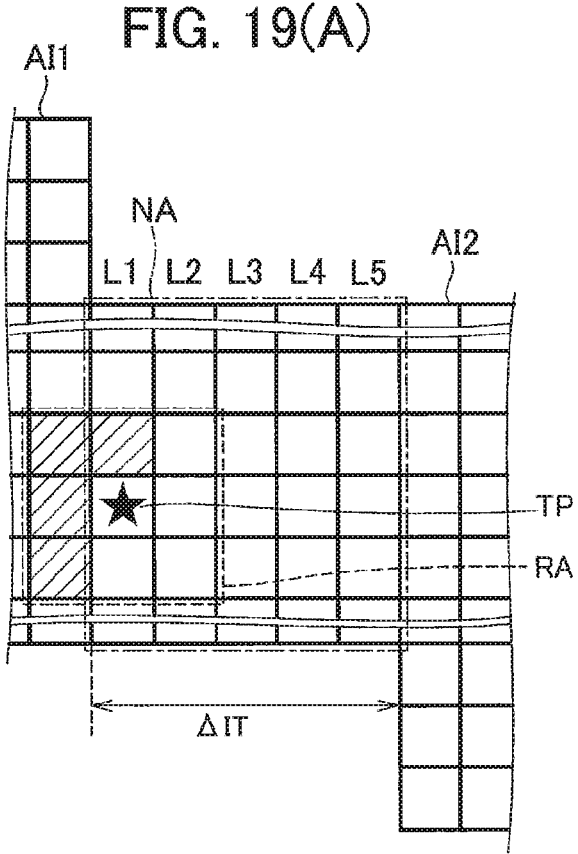
FIGS. 19(A) and 19(B) are explanatory diagrams illustrating the interpolating pixel generation process according to the first embodiment.
Figure 19B:
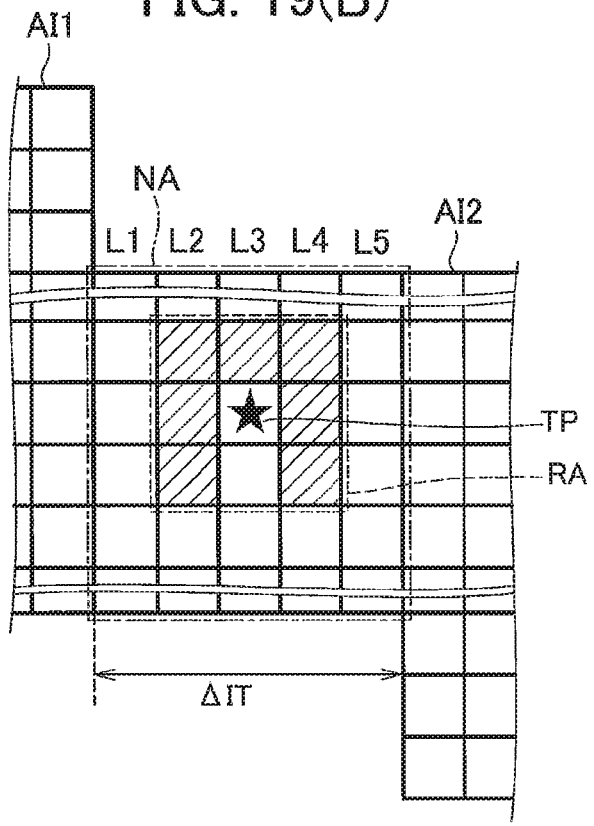

FIG. 18 is a flowchart illustrating the interpolating pixel generation process. FIGS. 19(A) and 19(B) are explanatory diagrams illustrating the interpolating pixel generation process according to the first embodiment. FIGS. 19(A) and 19(B) shows an interpolating region NA constituted by the plurality of interpolating pixels between the two complemented scan images AI1 and AI2. In S900 the CPU 410 sequentially selects one target line from among lines in the interpolating region NA on a line-to-line basis. As shown in FIGS. 19(A) and 19(B), the interpolating region NA includes 5 lines extending in the vertical direction. The CPU 410 selects, as a target line, every one line according to an ascending order of lengths from nearest one of the complemented scan images AI1 and AI2. In the example shown in FIGS. 19(A) and 19(B), the CPU 410 selects the lines L1 and L5 in contact with the corresponding one of the two complemented scan images AI1 and AI2 as a first and second target line respectively, selects lines L2 and L4 in contact with the corresponding one of the lines L1 and L5 as the third and fourth lines respectively, and selects a line L3 as the final target line.

In S905 the CPU 410 selects a target pixel TP from among a plurality of pixels included in the target line. For example, selection of the target pixel TP is sequentially made in an order of the plurality of pixels in the target line from top to bottom.

In S910 the CPU 410 sets a peripheral region RA surrounding the target pixel TP. As shown in FIGS. 19(A) and 19(B), the peripheral region RA is set in a manner identical to that is used when the peripheral region RA is identified in the complemented process.

In S915 the CPU 410 selects at least one effective peripheral pixels having effective pixel value from among 8 pixels, that is, peripheral pixels in the peripheral region RA except the target pixel TP. Each effective peripheral pixel is one of a pixel constituting the complemented scan image AI1 (including the complement images formed in the complement process), a pixel constituting the complemented scan image AI2 (including the complement images formed in the complement process), and a blank pixel whose pixel value has already been determined in the interpolating pixel generation process. In the example shown in FIG. 19(A), the target pixel TP is set to an interpolating pixel on the line L1. At this time, pixel values are undetermined for all of the interpolating pixels on the line L2 and for interpolating pixels on the line L1 that are positioned lower than the target pixel TP. Four pixels indicated by hatching are set as the effective peripheral pixels. In the example shown in FIG. 19(B), the target pixel TP is set to an interpolating pixel on the line L3. At this time, pixel values are undetermined for interpolating pixels on the line L3 that are positioned lower than the target pixel TP. In this case, pixel values are determined for interpolating pixels other than the above described undetermined interpolating pixels. Seven pixels indicated by hatching are set as the effective peripheral pixels.

In S920 the CPU 410 specifies a pixel whose pixel value of Green (G value) is a median of G values among the selected at least one effective peripheral pixel similarly to S420 shown in FIG. 11.

In S930 the CPU 410 determines whether all the pixels in the target line are processed as the target pixel TP. When there is an unprocessed pixel (S930: NO), the CPU 410 returns to S905 and sets an unprocessed pixel as the target pixel. When all the pixels in the target line are processed (S930: YES), in S935 the CPU 410 determines whether all the lines in the interpolating region NA are processed as the target line. When there is an unprocessed line (S935: NO), the CPU 410 returns to S900 and selects an unprocessed line as the target line. When all the lines are processed (S935: NO), the CPU 410 ends the interpolating pixel generation process.

In S815 shown in FIG. 17 the CPU 410 performs addition or removal of pixels in a vicinity of an outer edge of the arranged image OI on the basis of the gravity center thereof so as to adjust the size of the arranged image OI to be a prescribed rectangular size (A3 size for example). In S820 the CPU 410 converts the arranged image data representing the arranged image OI into a prescribed format and generates the arranged image file representing the arranged image OI. For example, the CPU 410 performs the JPEG compression on the arranged image data of the RGB image data and generates the arranged file in the JPEG format.

According to the above embodiment, in S25 shown in FIG. 3, the CPU 410 acquires the first and second scan data representing the first and second scan image SI1 and SI2 respectively. The first and second scan images SI1 and SI2 respectively includes the first and second original images CI1 and CI2 each representing a part of one target object (an original 10). In S30 the CPU 410 performs the first tilt correction process on the first scan data to generate the first tilt corrected scan data representing the first tilt corrected scan image RI1 (FIG. 7(A)). The CPU 410 specifies the residual blank regions SA1 and SA2 using the first blank removed scan data through the processes S35-S42. Specifically, the CPU 410 specifies the residual blank regions SA1 and SA2 in the first blank removed scan image DI1 through the residual blank identification processes A and B (S35 and S42). The residual blank regions SA1 and SA2 are respectively adjacent to the slant ends GTR and GTL of the first original image CI1 in the blank removed scan image DI1 (FIG. 7(B)). The slant ends GTL and GTR are ends of the first original image CI1 with respect to the horizontal direction and slanted with respect to the ends of the first blank removed scan image in the horizontal direction by angles based on the rotational angle used in the first tilt correction process.

The CPU 410 performs the complement process on the first blank removed scan data to generate the first complemented scan data representing the first complemented scan image AI1. Accordingly, as shown in FIG. 7(C), the first complemented scan image AI1 includes the first original image CI1 and the complement images formed in the residual blank regions SA1 and SA2. In S55 (FIG. 3), the CPU 410 generates the arranged image data representing the arranged image OI in which the first and second complemented scan images AI1 and AI2 (or the first and second original images CI1 and CI2) are arranged.

Accordingly, the CPU 410 generates the first complemented scan data in which the complement images are formed in the residual blank regions SA1 and SA2 adjacent to the first slant ends that are slanted with respect to the ends of the first tilt corrected scan image in the horizontal direction by angles based on the rotational angle used in the tilt correction process. The CPU 410 generates the arranged image data representing the arranged image showing the target object using the first complemented scan data. Accordingly, generation of steaks between the first and second original images CI1 and CI2 in the arranged image due to the residual blank regions SA1 and SA2 can be reduced. These streaks are generally caused by a difference in gradation between pixels. Thus, if the complement images are not formed in the residual blank region, a difference in gradation between the target image and the residual blank region may cause the streaks.

In the example shown in FIG. 13(B), a side of the residual blank region SA1 (the right side), that is, a side of the slant end GTR (the side of the right end RT1 in the complemented scan image AI1 shown in FIG. 7(B)) is an end in a direction from the first original image CI1 to the second original image CI2 in the arranged image OI1. That is, the residual blank region SA1 is on a border between the first and second original images CI1 and CI2. When the residual blank regions SA and SA2 are on the border, the residual blank regions SA1 and SA2 tend to represent streaks in the arranged image OI. However, the complemented scan data is generated so that the complement images are formed in the residual blank regions SA1 and SA2 according to the embodiment. Accordingly, generation of the streaks between the first and second original images CI1 and CI2 caused by the residual blank regions SA1 and SA2 can be reduced in comparison with a case where no complement images are formed in the residual blank regions SA1 and SA2.

Further, in the embodiment, similarly to the first scan data, the CPU 410 performs the processes (S20-S45) on the second scan data and generates the second complemented scan data representing the second complemented scan image AI2 (FIGS. 5(B) and 13(B)). The second complemented scan image AI2 includes the complement images in the residual blank regions in addition to the second original image CI2, similarly to the complemented scan image AI1. The CPU 410 generates the arranged image data representing the arranged image OI in which the first and second complemented scan images are arranged by using the first and second complemented scan data.

Accordingly, generation of the streaks between the first and second original images CI1 and CI2 caused by the residual blank region SA1 and SA2 can be reduced more certainly.

The CPU 410 determines a relative position of the two original images CI1 and CI2 using the two sets of complemented scan data of the complemented scan images AI1 and AI2 in which the complement images are formed through the arrangement position determination process. Accordingly, the relative position is determined more accurately than a case where a relative position is determined using the scan data in which no complement image is formed.

The residual blank region SA1 is contact with the slant end GTR slanted, by a rotational angle used in the tilt correction process, with respect to an end of the blank removed scan image DI1 in the horizontal direction (for example, the right end RT1). A region outside of the first scan image SI1 (or a region that is not existed in the first scan image SI1 before the tilt correction process) is emerged as the residual blank region in the first blank removed scan image DI1. According to the embodiment, generation of steaks in the arranged image OI caused by the residual blank region SA1 can be reduced.

The CPU 410 can identify the type of the residual blank regions such as the residual blank region SA1 in high accuracy by using the blank removed mask image.

The residual blank region SA2 is contact with the slant end GTL slanted with respect to an end of the blank removed scan image DI1 in the horizontal direction (for example, the left end LT1) by the angle θ2. The angle θ2 is a difference between the actual slant angle θ3 and the rotational angle θ1 used in the tilt correction process. Streaks caused by the residual blank regions may be generated in the arranged image OI when the tilt of the first original image CI1 cannot be corrected accurately in the tilt correction process. In the embodiment, such generation of steaks in the arranged image OI can be reduced.

In the residual blank identification process B, the CPU 410 identifies a plurality of specific color lines between an end of the tilt corrected scan image DI1 in the horizontal direction (for example, the left end LT1) and the end of the first original image CI1 (for example, the left end). Here, the plurality of specific color lines gradually becomes shorter as the position of the line goes away from the end of the first original image CI1 in the horizontal direction (for example, the left end). Each of the plurality of specific color lines is a vertical line on which specific color pixels are arranged, that is a vertical line on which the number Ln of the specific color pixels is consecutively arranged. The CPU 410 identifies a region including the plurality of specified specific color lines with the residual blank region SA2. Each specific color pixel includes color of the blank region of the first scan image SI1 (or the color of the original blank image WB1a shown in FIG. 7(A)). Accordingly, the residual blank region SA2 can be identified with high accuracy on the basis of the characteristics that the residual blank region SA2 has a narrow triangular shape. The residual blank region SA2 is generated when the tilt of the first original image CI1 cannot be corrected in the tilt correction process with accuracy. However, according to the embodiment, the residual region SA 2 can be identified easily and accurately.

In the blank removal process shown in FIG. 6, the CPU 410 identifies a plurality of blank lines along an end of the tilt corrected scan image RI1 in the horizontal direction and removes the plurality of blank lines from the first tilt corrected scan image RI1. In the residual blank identification processes A and B the CPU 410 identifies the residual blank regions SA1 and SA2 in the blank removed scan image DI1 after the blank removal process. Accordingly, the residual blank regions SA1 and SA2 can be identified after removal of the plurality of blank lines that is determined to constitute the blank region in the entire vertical length. In other words, the residual blank regions SA1 and SA2 can be determined appropriately.

In the complement process shown in FIG. 11 (S405-S420), the CPU 410 selects the target pixel TP from among the plurality of pixels in the residual blank regions SA1 and SA2, and determines the pixel value of the target pixel to the median of pixel values from among at least one pixel in the peripheral region RA surrounding the target pixel TP. Each of the at least one pixel in the peripheral region RA surrounding the target pixel TP is one of a pixel in the first original image CI1 and a pixel in the residual blank region SA1 or SA2 whose pixel value is determined. Accordingly, the pixel value of the target pixel can be set to a pixel value of one pixel in the peripheral pixels, thereby suppressing deterioration of contrast in the complement image compared to a case where the pixel value of the target pixel is set to an average value of the peripheral pixels.

In the interpolating pixel generation process shown in FIG. 18, the CPU 410 determines the pixel value of the target pixel TP by using at least one pixel in the peripheral region RA. Each of the at least one pixel in the peripheral region RA is one of a pixel representing the first or second original image CI1 or CI2 and an interpolating pixel whose pixel value has already determined. Accordingly, in the arranged image in which the first and second original images CI1 and CI2 are arranged with the gap ΔIT, the gap ΔIT can be prevented from becoming noticeable as streak.

B. Second Embodiment

An interpolating pixel generation process according to a second embodiment is different from that of the first embodiment. FIG. 20 is a flowchart illustrating the interpolating pixel generation process according to the second embodiment. FIGS. 21(A) and 21(B) are explanatory diagrams illustrating the interpolating pixel generation process according to the second embodiment. In S1000 the CPU 410 performs the processes S900-S935 shown in FIG. 18. At this point, all the pixel values are determined for the interpolating pixels in the interpolating region NA. In S1010 the CPU 410 determines whether the number of vertical lines in the interpolating region NA is an even number. In the example shown in FIG. 19, the number of lines in the interpolating region NA is 5, that is, an odd number. In the example shown in FIG. 20, the number of lines in the interpolating region NA is 4, that is, an even number.

When the number of lines in the interpolating region NA is an even number (S1010: YES), in S1020 the CPU 410 selects once again, as the target line, a line that has been selected as the second-to-last target line (that is, a line proceeding-by-one line from the last line) in S1000. In the example shown in FIG. 21(A), the line L2 is the line that has been selected as the second-to-last target line.

In S1030 the CPU 410 selects one target pixel TP from among the plurality of pixels in the target line. For example, the CPU 410 sequentially selects the target pixel in an order of the plurality of pixels in the target line from top to bottom on a pixel-to-pixel basis.

In S1040 the CPU 410 selects 6 pixels positioned at left or right of the target pixel TP as usable pixels. Specifically, as indicated by hatching in FIG. 21(B), the CPU 410 selects 3 pixels positioned at the right of the target pixel TP and 3 pixels positioned at the left of the target pixel TP from among 9 peripheral pixels in the peripheral region RA of the target pixel TP. Pixel values of the 6 pixels have determined in S1000.

In S1050 the CPU 410 identifies a pixel whose pixel value of Green (G value) is a median of G values among the selected 6 pixels. In S1060 the CPU 410 determines RGB values of the target pixel TP to RGB values of the selected pixel having the median of G values.

In S1070 the CPU 410 determines whether all the pixels in the target line are processed as the target pixel TP. When there is an unprocessed pixel (S1070: NO), the CPU 410 returns to S1030 and selects an unprocessed pixel as the target pixel TP. When all the pixels are processed (S1070: YES), the CPU 410 ends the interpolating pixel generation process.

When the number of lines in the interpolating region NA is an odd number (S1010: NO), the CPU 410 skips S1020-S1070 and ends the interpolating pixel generation process. In other words, the interpolating pixel generation process according to the second embodiment is essentially the same as that of the first embodiment.

A line positioned at a center in the horizontal direction in the interpolating region NA (hereinafter referred to as a center line) is substantially equidistant from the complemented scan images AI1 and AI2. Pixel values should be determined using pixel values of pixels in both the complemented scan images AI1 and AI2 for a plurality of pixels in the center line. When the number of lines in the interpolating region NA is an odd number, the center line is only one line (the line L3 in the example of FIG. 19(B)). In this case, the pixel values of the plurality of interpolating pixels on the line L3 are determined after the pixel values of the interpolating pixels on the left and right lines L2 and L4 are determined, and thus are determined indirectly using the two complemented scan images AI1 and AI2.

On the other hand, when the number of lines in the interpolating region NA is an even number, that is the number of lines is 2n (n is a natural number), the center line includes two lines (the lines L2 and L3 in the example of FIGS. 21(A) and 21(B)). One of two lines is the second-to-last processed target line (that is, the (2n−1)-th processed target line), and another is the last processed target line (that is, the 2n-th processed target line). In the example of FIGS. 21(A) and 21(B), the (2n−1)-th processed target line is the line L2 and the 2n-th processed target line is the line L3. Because the pixel values of the interpolating pixels on the line L3 are determined after the pixel values of the interpolating pixels on the left and right lines L2 and L4 are determined, and thus are determined indirectly using the two complemented scan images AI1 and AI2. In S1000, the pixel values of the interpolating pixels on the line L2 are determined when the pixel values of the interpolating pixels on the right line L3 are undetermined though the pixel values of the interpolating pixels on the left line L1 are determined. As shown in FIG. 21(A), no effective peripheral pixel exist on the right of the target pixel TP in the peripheral region RA of the target pixel TP. Thus, in S1000 pixel values of the plurality of interpolating pixels on the line L2 are determined using only the pixel values of pixels in the first complemented scan image AI1. In this case, the determined pixel values of the plurality of interpolating pixels may be inappropriate, causing steak on the line L2. In the embodiment, in S1020 the CPU 410 selects once again, as the target line, the line L2 that has been selected as the (2n−1)-th processed target line in S1000 after all pixel values for pixels on 2n lines have been determined. Accordingly, the pixel values of the interpolating pixels on the line L2 are determined once again considering the pixel values of the interpolating pixels on the line L3 (S1030-S1070), thereby suppressing inappropriate determination of the pixel values for the plurality of interpolating pixels on the line L2.

C. Third Embodiment

Figure 22:
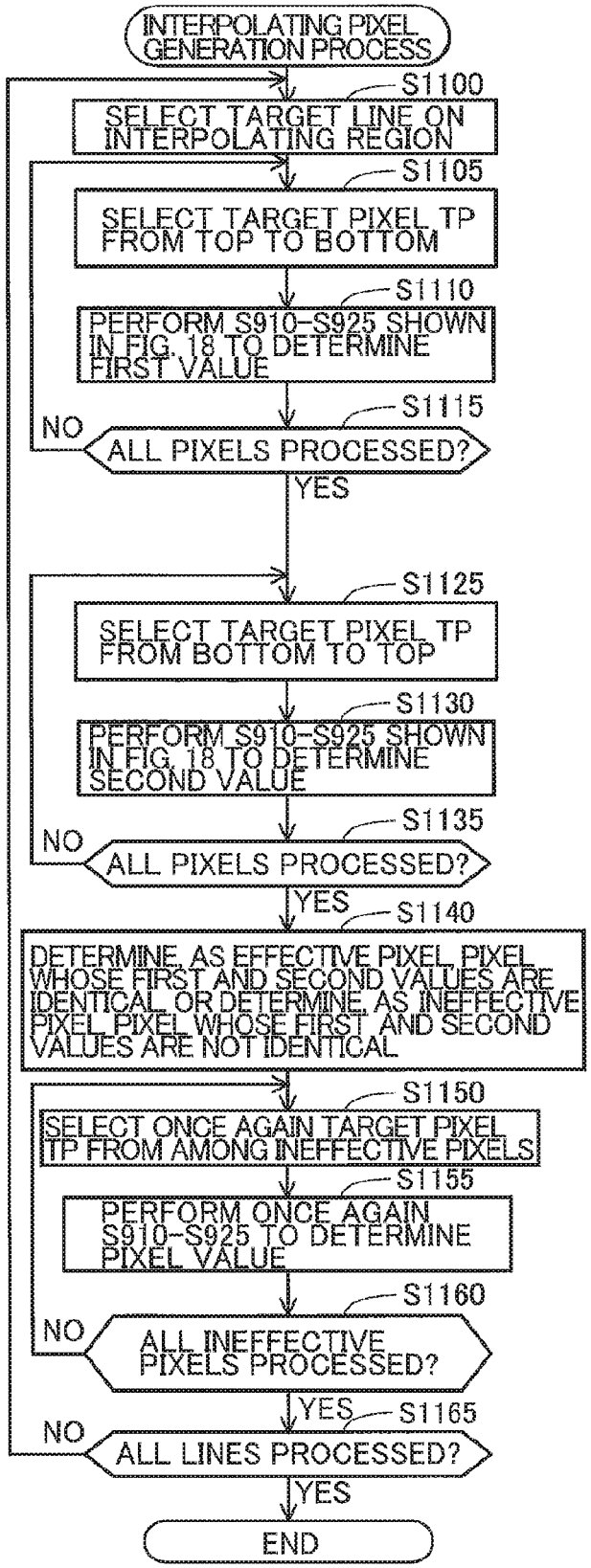
FIG. 22 is a flowchart illustrating an interpolating pixel generation process according to a third embodiment.

An interpolating pixel generation process according to a third embodiment is different from that of the first embodiment. FIG. 22 is a flowchart illustrating the interpolating pixel generation process according to the third embodiment. FIGS. 23(A) and 23(B) are explanatory diagrams illustrating the interpolating pixel generation process according to the third embodiment. In S1100 the CPU 410 selects a target line from among at least one line in the interpolating region NA, similarly to S900.

In S1105 the CPU 410 selects a target pixel TP from among the plurality of pixels on the target line in a sequential order from top to bottom on a pixel-to-pixel basis.

In S1110 the CPU 410 performs the processes S910-S925 shown in FIG. 18, and thus determines a first value (including first RGB values) of the target pixel TP.

In S1115 the CPU 410 determines whether all the pixels in the target line are processed as the target pixel TP. When there is an unprocessed pixel (S1115: NO), the CPU 410 returns to S1105 and selects an unprocessed pixel as the target pixel TP. When all the pixels are processed (S1115: YES), the CPU 410 proceeds to S1125. At this point, the first values are determined for all the pixels on the target line.

In S1125 the CPU 410 selects a target pixel from among the plurality of pixels on the target line in a sequential order from bottom to top on a pixel-to-pixel basis. That is, the sequential order in S1125 is a reverse order of S1105.

In S1130 the CPU 410 performs the processes S910-S925 shown in FIG. 18, and thus determines a second value (including second RGB values) of the target pixel TP.

In S1135 the CPU 410 determines whether all the pixels in the target line are processed as the target pixel TP. When there is an unprocessed pixel (S1135: NO), the CPU 410 returns to S1125 and selects an unprocessed pixel as the target pixel TP. When all the pixels are processed (S1135: YES), the CPU 410 proceeds to S1140. At this point, the second values are determined for all the pixels on the target line.

Hatching of FIG. 23(A) indicates effective peripheral pixels used when the first value is determined. Hatching of FIG. 23(B) indicates effective peripheral pixels used when the second value is determined. As shown in FIGS. 23(A) and 23(B), there are common effective peripheral pixels used when determining both the first value and the second value. However, a part of the effective peripheral pixels used when determining the first value does not included in the effective peripheral pixel(s) used when determining the second value, and vice versa. Accordingly, there is a possibility that the first value is identical to the second value and there is also a possibility that the first value is different from the second value.

In S1140 the CPU 410 classifies each of the plurality of pixels on the target line into one of an effective pixel and an ineffective pixel. Specifically, the CPU 410 determines that the pixel is the effective pixel when the first value of the pixel is identical to the second value of the pixel. The CPU 410 determines that the pixel is the ineffective pixel when the first value of the pixel is different from the second value of the pixel.

In S1150 the CPU 410 selects once again a target pixel TP from among ineffective pixels of the plurality of pixels on the target line.

In S1155 the CPU 410 performs the processes S910-S925 shown in FIG. 18 and determines the pixel value (RGB values) of the target pixel TP once again. In this case, the peripheral region RA includes ineffective pixels, the CPU 410 does not use the ineffective pixels as the effective peripheral pixels when determining the pixel value of the target pixel TP. The peripheral region RA includes effective pixel, the CPU 410 use the effective pixel as the effective peripheral pixels when determining the pixel value of the target pixel TP.

In S1160 the CPU 410 determines whether all the ineffective values on the target line are processed as the target pixel. When there is an unprocessed ineffective pixel (S1160: NO), the CPU 410 returns to S1150 and selects an unprocessed ineffective pixel. When all the ineffective pixels are processed (S1160: YES), the CPU 410 proceeds to S1165. At this point, final pixel values are determined for all the pixels on the target line. Accordingly, in succeeding processes of succeeding target lines, all the pixels on the current target lines are used as the effective peripheral pixels.

In S1165 the CPU 410 determines whether all the lines in the interpolating region NA are processed as the target line. When there is an unprocessed line (S1165: NO), the CPU 410 returns to S1100 and selects an unprocessed line as the target line. When all the lines are processed (S1165: YES), the CPU 410 ends the interpolating pixel generation process.

According to the third embodiment, the CPU 410 sequentially selects the target pixel TP from among interpolating pixels in a specific line in an order of a specific direction on a pixel-to-pixel basis, and determines the first value of the plurality of interpolating pixels on the specific line (S1105-S1115). The CPU 410 sequentially selects the target pixel from among interpolating pixels in the specific line in an order of a reverse direction of the specific direction on a pixel-to-pixel basis, and determines the second value of the plurality of interpolating pixels on the specific line (S1125-S1135). The CPU 410 selects once again, as the target pixel TP, a pixel for which the first value is different from the second value from among the plurality of interpolating pixels on the specific line (S1150), and determines the pixel value of the target pixel TP selected once again using at least one peripheral pixel that includes the effective pixel and does not include the ineffective pixel (S1155). There may be cases where inappropriate pixel values of the interpolating pixels arranged on the specific line are determined due to a selection order of the target pixel. The configurations of the third embodiment can reduce occurrence of such cases. Specifically, when the first value is identical to the second value, the determined pixel value is appropriate regardless of the selection order. On the other hand, when the first value is different from the second value, the determined value may be inappropriate due to the selection order of the target pixel TP. In the third embodiment, the CPU 410 selects once again pixels for which the first value is different from the second value as the target pixel TP, and determines once again the pixel value of the selected pixel using pixel value(s) of pixel(s) for which the first value is identical to the second value, thereby reducing influence of the selection order on determined pixel values.

According to the second and third embodiments, the CPU 410 selects once again, as the target pixel TP, at least one pixel from among interpolating pixels whose pixel values have been determined, and determines once again a pixel value of the target pixel using at least one pixel value of the peripheral pixel for the current target pixel TP that selected once again. Accordingly, the pixel value can be more appropriately determined for at least one interpolating pixel whose pixel value has determined once. Therefore, the configuration of the second and third embodiment can reduce cases where a region of the gap ΔIT becomes noticeable as steak.

D. Modifications (1) In the first embodiment, the CPU 410 forms the complement images on the residual blank regions of both the blank removed scan images DI1 and DI2, and generates the two complemented scan images AI1 and AI2. Alternatively, the CPU 410 may form the complement image(s) only on the residual blank region(s) of the first blank removed scan image DI1. Therefore, in this case, the CPU 410 forms no complement image on the residual blank region of the second blank removed scan image DI2. In this case, the CPU 410 may form the larger complement image for the first blank removed scan image DI1 than that of the first embodiment. In this case, the larger complement image for the first blank removed scan image DI1 may fill the blank region of the second blank removed scan image DI2 in the arranged image OI in which the first complemented scan image AI1 and the second blank removed scan image DI2 are arranged. Here, because the second complemented scan data of the second complemented scan image AI2 are not generated, the first complemented scan image AI1 and the second blank removed scan image DI2 are arranged in the arranged image OI.

(2) In the first embodiment, the CPU 410 executes the residual blank identification processes A and B, and thus identifies the residual blank regions SA1 and SA2. Alternatively, the CPU 410 may execute either one of the residual blank identification processes A and B, and thus may identify the corresponding one of the residual blank regions SA1 and SA2. When the tilt correction process is performed with high accuracy for example, the residual blank identification process B may be omitted. When there is a low possibility that a part of an original is lacked during reading operation, the residual blank identification process A may be omitted.

(3) In the above described embodiments, the interpolating pixel generation process is performed for determining the pixel values of the interpolating pixels between the two complemented scan images AI1 and AI2 in which the complement images are formed. However, the present disclosure is not limited to this. The interpolating pixel generation process may be used when an arranged image is generated by arranging two general scan images in order to represent one target object. That is, the interpolating pixel generation process may be performed regardless of whether the complement process is performed on the scan data.

(4) The interpolating pixel generation process of the third embodiment shown in FIG. 22 may not be performed on all the lines constituted by the interpolating pixels. For example, the interpolating pixel generation process shown in FIG. 22 may be performed on lines in the vicinity of the center of the interpolating regions NA in the horizontal direction, such as the line L3 shown in FIG. 19(A), or the lines L2 and L3 shown in FIG. 21(A). In this case, the interpolating pixel generation process of the first embodiment shown in FIG. 18 may be performed on the remaining lines in the interpolating region NA.

(5) In the first embodiment, the CPU 410 uses the median of G values in the effective peripheral pixels in the peripheral region RA for determining pixel values of the pixels in the complement images, for determining the pixel values of the pixels in the restoration region, and for determining the pixel values of the interpolating pixels. However, the present disclosure is not limited to this. The CPU 410 may use a different value such as an average pixel value of the effective peripheral pixels in the peripheral region RA.

(6) In the first embodiment, the scanner 200 reads the both sides of the two-folded original 10 along the line VL at a time. Alternatively, a flatbed type scanner may read the two-folded original 10 by two passes and generates two sets of scan data.

(7) In the first embodiment, the CPU 410 generates the arranged image file representing the arranged image in which the two original images CI1 and CI2 are arranged in the horizontal direction. Alternatively, the CPU 410 may generate an arranged image file representing an arranged image in which the two original images CI1 and CI2 are arranged in the vertical direction.

(8) In the first embodiment, the CPU 410 generates the arranged image data representing the arranged image in which two original images are arranged. The present disclosure is not limited to this. For example, the CPU 410 may generate arranged image data representing an arranged image using an arbitrary number of image files. For example, the CPU 410 may generate arranged image data representing an arranged image in which four image files are arranged using four image files.

(9) In the embodiments, the scanner 200 reads the original to generate the two image files that are used to generate the arranged image data. Alternatively, a digital camera may take pictures of both sides of the half-folded original 10 to generate the two image files.

(10) The processes performed by the CPU 410 of the server 400 (S25-S60 of FIG. 3, for example) may be performed by the CPU 210 of the scanner 200. In this case, the image processing system 1000 may not have the server 400, and the scanner 200 may perform the entire process of FIG. 3. Alternatively, the processes performed by the CPU 410 of the server 400 may be performed by a CPU (not shown) of the personal computer 500 connected to the scanner 200. For example, the CPU (not shown) of the personal computer 500 may execute a scanner driver program installed in the personal computer 500 to execute the processes. The server 400 is a single computing machine in the embodiments. However, the server 400 may be a computing system including a plurality of computing machines capable of communicating each other.

(11) Part of the configurations implemented in hardware in the embodiments described above may be replaced by software and, conversely, part of the configurations implemented in software may be replaced by hardware.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments thereof, it would be apparent to those skilled in the art that various changes and modifications may be made therein.

What is claimed is:

1. An image processing apparatus comprising:
   a processor; and
   a memory storing computer-readable instructions therein, the computer-readable instructions, when executed by the processor, causing the image processing apparatus to perform:
      acquiring first image data representing a first image and second image data representing a second image, the first image including a first target image showing a part of a target object and the second image including a second target image showing another part of the target object;
      generating first corrected image data representing a first corrected image by performing, on the first image data, a first tilt correction process in which the first image is rotated by a first rotation angle so as to correct a tilt of the first target image, the first corrected image including a first corrected target image based on the first target image, the first corrected target image including a first slant end with respect to a first direction, the first slant end being slanted with respect to a first end of the first corrected image with respect to the first direction by a first slant angle based on the first rotation angle;
      identifying a first blank region from the first corrected image, the first blank region being a region in contact with the first slant end, the first blank region including a plurality of first blank-region pixels therein;
      generating first complemented image data representing a first complemented image by performing, on the first corrected image data, a first complement process in which a plurality of pixel values of the plurality of first blank-region pixels is determined using a plurality of pixel values of a plurality of pixels that is located in a first complement target image and along the first slant end, the first complement target image being one of the first corrected target image and an image based on the first corrected target image, the first complemented image including the first complement target image and a first complement image formed by the plurality of first blank-region pixels in the first blank region; and
      generating arranged image data representing an arranged image by using the first complemented image data, wherein, in the arranged image, an first arrangement target image and a second arrangement target image are arranged to represent the target object, the first arrangement target image being one of the first complement target image and an image based on the first complement target image, the second arrangement target image being one of the second target image and an image based on the second target image, the first arrangement target image including an end corresponding to the first slant end as an end with respect to a direction from the first arrangement target image to the second arrangement target image.

2. The image processing apparatus according to claim 1, wherein the computer-readable instructions, when executed by the processor, causes the image processing apparatus to further perform:
   generating second corrected image data representing a second corrected image by performing, on the second image data, a second tilt correction process in which the second image is rotated by a second rotation angle so as to correct a tilt of the second target image, the second corrected image including a second corrected target image based on the second target image, the second corrected target image including a second slant end with respect to a second direction, the second slant end being slanted with respect to a second end of the second corrected image with respect to the second direction by a second slant angle based on the second rotation angle;
   identifying a second blank region from the second corrected image, the second blank region being a region in contact with the second slant end, the second blank region including a plurality of second blank-region pixels therein; and
   generating second complemented image data representing a second complemented image by performing, on the second corrected image data, a second complement process in which a plurality of pixel values of the plurality of second blank-region pixels is determined using a plurality of pixel values of a plurality of pixels that is located in the second complement target image and along the second slant end, the second complement target image being one of the second corrected target image and an image based on the second corrected target image, the second complemented image including the second complement target image and a second complement image formed by the plurality of second blank-region pixels in the second blank region, the second arrangement target image being one of the second complement target image and an image based on the second complement target image,
   wherein the arranged image data is generated by using the second complemented image data, wherein, in the arranged image, the first arrangement target image and the second arrangement target image are arranged to represent the target object, the second arrangement target image including an end corresponding to the second slant end as an end with respect to a direction from the second arrangement target image to the first arrangement target image.

3. The image processing apparatus according to claim 1, wherein the computer-readable instructions, when executed by the processor, causes the image processing apparatus to further perform determining a relative position between the first arrangement target image and the second arrangement target image by using the first complemented image data; and
   wherein the first arrangement target image and the second arrangement target image are arranged to form the arranged image by using the relative position.

4. The image processing apparatus according to claim 1, wherein the first rotation angle is determined so that a partial end of the first target image, which is not the same as an end of the first image, is rotated to be parallel to the end of the first corrected image;
  wherein the first slant end is an end of the first corrected target image obtained by rotating an end of the first image;
  wherein the first slant angle is the same as the first rotation angle; and
  wherein the first blank region is outside of the first corrected target image.

5. The image processing apparatus according to claim 4, wherein the identifying includes generating corrected mask image data by performing the first tilt correction process on mask data, the mask data representing a mask image having a size and a shape same as a size and a shape of the first image, respectively, wherein the corrected mask image data represents a corrected mask image as a result of rotation of the mask image by the first rotation angle in the first tilt correction process; and
  wherein the first blank region is identified using the corrected mask image data.

6. The image processing apparatus according to claim 1, wherein an end of the first target image with respect to the first direction is tilted with respect to an end of the first image with respect to the first direction by an actual tilt angle;
  wherein the first rotation angle is determined so that the end of the first target image is rotated so as to be parallel to the end of the first corrected image; and
  wherein the first slant angle is a difference in angle between the first rotation angle and the actual tilt angle.

7. The image processing apparatus according to claim 6, wherein the identifying includes:
  identifying a plurality of specific color lines between the end of the first corrected image with respect to the first direction and an end of the first corrected target image with respect to the first direction; and
  identifying a region including the plurality of specific color lines as the first blank region; and
  wherein each of the plurality of first specific color lines includes a plurality of specific-color pixels having specific color, the plurality of specific-color pixels being consecutively arranged in a direction orthogonal to the first direction; and
  wherein length of each of the plurality of first specific color lines in the direction orthogonal to the first direction is gradually shortened while going away from the end of the first corrected image with respect to the first direction.

8. The image processing apparatus according to claim 1, wherein the identifying includes identifying, from the first corrected image, a plurality of blank lines along an end of the first corrected image with respect to the first direction;
  wherein the first blank region is identified from an image that is obtained by removing the plurality of blank lines from the first corrected image; and
  wherein each of the plurality of blank lines satisfies a condition that each of the plurality of blank lines extends in a direction orthogonal to the first direction, has an entire length of the first corrected image in the direction orthogonal to the first direction, and constitutes a blank in the first corrected image.

9. The image processing apparatus according to claim 1 wherein the generating the first complemented image data includes:
  selecting a target pixel from among the plurality of first blank-region pixels; and
  determining a pixel value of the target pixel to a median value of at least one pixel in a specific region located peripheral the target pixel, each of the at least one pixel being one selected from a group consisting of a pixel in the first complement target image and a pixel in the first blank region whose pixel value has already been determined.

10. The image processing apparatus according to claim 1, wherein the arranged image data is generated so that the first arrangement target image and the second arrangement target image are arranged with a gap therebetween;
  wherein the generating the arranged image data includes:
    selecting a target pixel from among a plurality of interpolating pixels located on the gap; and
    determining a pixel value of the target pixel by using at least one pixel value of at least one pixel, each of the at least one pixel satisfying a condition that a pixel is a peripheral pixel in a specific region located peripheral the target pixel and a condition that a pixel is one selected from a group consisting of a pixel in the first arrangement target image, a pixel in the second arrangement target image, and an interpolating pixel whose pixel value has already been determined.

11. A non-transitory computer readable storage medium storing a set of program instructions installed on and executed by a computer, the program instructions comprising:
  acquiring first image data representing a first image and second image data representing a second image, the first image including a first target image showing a part of a target object and the second image including a second target image showing another part of the target object;
  generating first corrected image data representing a first corrected image by performing, on the first image data, a first tilt correction process in which the first image is rotated by a first rotation angle so as to correct a tilt of the first target image, the first corrected image including a first corrected target image based on the first target image, the first corrected target image including a first slant end with respect to a first direction, the first slant end being slanted with respect to a first end of the first corrected image with respect to the first direction by a first slant angle based on the first rotation angle;
  identifying a first blank region from the first corrected image, the first blank region being a region in contact with the first slant end, the first blank region including a plurality of first blank-region pixels therein;
  generating first complemented image data representing a first complemented image by performing, on the first corrected image data, a first complement process in which a plurality of pixel values of the plurality of first blank-region pixels is determined using a plurality of pixel values of a plurality of pixels that is located in a first complement target image and along the first slant end, the first complement target image being one of the first corrected target image and an image based on the first corrected target image, the first complemented image including the first complement target image and a first complement image formed by the plurality of first blank-region pixels in the first blank region; and
  generating arranged image data representing an arranged image by using the first complemented image data, wherein, in the arranged image, an first arrangement target image and a second arrangement target image are arranged to represent the target object, the first arrangement target image being one of the first complement target image and an image based on the first complement target image, the second arrangement target image being one of the second target image and an image based on the second target image, the first arrangement target image including an end corresponding to the first slant end as an end with respect to a direction from the first arrangement target image to the second arrangement target image.

* * * * *